(12) United States Patent
Weber et al.

(10) Patent No.: US 6,688,280 B2
(45) Date of Patent: Feb. 10, 2004

(54) AIR AND FUEL SUPPLY SYSTEM FOR COMBUSTION ENGINE

(75) Inventors: James Richard Weber, Lacon, IL (US); Scott A. Leman, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/143,908

(22) Filed: May 14, 2002

(65) Prior Publication Data

US 2003/0213462 A1 Nov. 20, 2003

(51) Int. Cl.$^7$ ............................ F02B 37/13; F02B 37/04
(52) U.S. Cl. .................... 123/305; 123/316; 123/90.16; 123/90.12; 123/562; 60/612
(58) Field of Search ........................... 123/90.11, 90.12, 123/90.15–90.18, 305, 316, 559.2, 562; 60/612

(56) References Cited

U.S. PATENT DOCUMENTS

| | | | |
|---|---|---|---|
| 4,424,790 A | 1/1984 | Curtil | 123/559 |
| 4,561,253 A | 12/1985 | Curtil | 60/606 |
| 4,815,423 A | 3/1989 | Holmér | 123/90.6 |
| 5,408,979 A * | 4/1995 | Backlund et al. | 123/562 |
| 5,682,854 A | 11/1997 | Ozawa | 123/316 |
| 6,026,786 A | 2/2000 | Groff et al. | 123/501 |
| 6,170,441 B1 | 1/2001 | Haldeman et al. | 123/25 D |
| 6,209,516 B1 | 4/2001 | Yamashita | 123/305 |
| 6,237,551 B1 * | 5/2001 | Macor et al. | 123/90.15 |
| 6,267,107 B1 * | 7/2001 | Ward | 123/305 |
| 6,273,076 B1 | 8/2001 | Beck et al. | 123/679 |
| 6,279,550 B1 | 8/2001 | Bryant | 123/562 |
| 6,302,076 B1 * | 10/2001 | Bredy | 123/184.21 |
| 6,571,765 B2 | 6/2003 | Kuboshima et al. | 123/316 |

OTHER PUBLICATIONS http://www.mazda.com.au/corpora/209.html, Oct. 16, 2001, pp. 1–6.
Yorihiro Fukuzawa et al., "Development of High Efficiency Miller Cycle Gas Engine", *Mitsubishi Heavy Industries, Ltd., Technical Review*, vol. 38, No. 3, Oct. 2001, pp. 146–150.
English Language JPO Abstract of JP Publication No. 05106415 A2, Apr. 27, 1993.
English Language JPO Abstract of JP Publication No. 2000145484 A, May 26, 2000.
English Language JPO Abstract of JP Publication No. 2000120457 A, Apr. 25, 2000.

\* cited by examiner

*Primary Examiner*—Erick Solis
(74) *Attorney, Agent, or Firm*—Finnegan, Henderson, Farabow, Garrett & Dunner

(57) ABSTRACT

A method of operating an internal combustion engine, including at least one cylinder and a piston slidable in the cylinder, may include supplying pressurized air from an intake manifold to an air intake port of a combustion chamber in the cylinder, selectively operating an air intake valve to open the air intake port to allow pressurized air to flow between the combustion chamber and the intake manifold substantially during a majority portion of a compression stroke of the piston, and operably controlling a fuel supply system to inject fuel into the combustion chamber after the intake valve is closed.

33 Claims, 7 Drawing Sheets

AIR AND FUEL SUPPLY SYSTEM FOR COMBUSTION ENGINE

TECHNICAL FIELD

The present invention relates to a combustion engine and, more particularly, to an air and fuel supply system for use with an internal combustion engine.

BACKGROUND

An internal combustion engine may include one or more turbochargers for compressing a fluid, which is supplied to one or more combustion chambers within corresponding combustion cylinders. Each turbocharger typically includes a turbine driven by exhaust gases of the engine and a compressor driven by the turbine. The compressor receives the fluid to be compressed and supplies the compressed fluid to the combustion chambers. The fluid compressed by the compressor may be in the form of combustion air or an air/fuel mixture.

An internal combustion engine may also include a supercharger arranged in series with a turbocharger compressor of an engine. U.S. Pat. No. 6,273,076 (Beck et al., issued Aug. 14, 2001) discloses a supercharger having a turbine that drives a compressor to increase the pressure of air flowing to a turbocharger compressor of an engine. In some situations, the air charge temperature may be reduced below ambient air temperature by an early closing of the intake valve.

Early or late closing of the intake valve, referred to as the "Miller Cycle," may reduce the effective compression ratio of the cylinder,.which in turn reduces compression temperature, while maintaining a high expansion ratio. Consequently, a Miller cycle engine may have improved thermal efficiency and reduced exhaust emissions of, for example, oxides of Nitrogen ($NO_x$). Reduced $NO_x$ emissions are desirable. In a conventional Miller cycle engine, the timing of the intake valve close is typically shifted slightly forward or backward from that of the typical Otto cycle engine. For example, in the Miller cycle engine, the intake valve may remain open until the beginning of the compression stroke.

While a turbocharger may utilize some energy from the engine exhaust, the series supercharger/turbocharger arrangement does not utilize energy from the turbocharger exhaust. Furthermore, the supercharger requires an additional energy source.

The present invention is directed to overcoming one or more of the problems as set forth above.

SUMMARY OF THE INVENTION

According to one exemplary aspect of the invention, a method of operating an internal combustion engine, including at least one cylinder and a piston slidable in the cylinder, is provided. The method may include supplying pressurized air from an intake manifold to an air intake port of a combustion chamber in the cylinder, selectively operating an air intake valve to open the air intake port to allow pressurized air to flow between the combustion chamber and the intake manifold substantially during a majority portion of a compression stroke of the piston, and operably controlling a fuel supply system to inject fuel into the combustion chamber after the intake valve is closed.

According to another exemplary aspect of the invention, a variable compression ratio internal combustion engine may include an engine block defining at least one cylinder, a head connected with the engine block, wherein the head includes an air intake port and an exhaust port, and a piston slidable in each cylinder. A combustion chamber may be defined by the head, the piston, and the cylinder. The engine may include an air intake valve controllably movable to open and close the air intake port, an air supply system including at least one turbocharger fluidly connected to the air intake port, and a fuel supply system operable to controllably inject fuel into the combustion chamber at a selected timing. A variable intake valve closing mechanism may be configured to keep the intake valve open by selective actuation of the variable intake valve closing mechanism.

According to yet another exemplary aspect of the invention, a method of operating an internal combustion engine, including at least one cylinder and a piston slidable in the cylinder, is provided. The method may include imparting rotational movement to a first turbine and a first compressor of a first turbocharger with exhaust air flowing from an exhaust port of the cylinder, and imparting rotational movement to a second turbine and a second compressor of a second turbocharger with exhaust air flowing from an exhaust duct of the first turbocharger. The method may also include compressing air drawn from atmosphere with the second compressor, compressing air received from the second compressor with the first compressor, and supplying pressurized air from the first compressor to an air intake port of a combustion chamber in the cylinder via an intake manifold. The method also includes controllably operating a fuel supply system to inject fuel directly into the combustion chamber, and selectively operating an air intake valve to open the air intake port to allow pressurized air to flow between the combustion chamber and the intake manifold during a portion of a compression stroke of the piston.

According to still another exemplary aspect of the invention, a method of controlling an internal combustion engine having a variable compression ratio is provided. The engine may have a block defining a cylinder, a piston slidable in the cylinder, a head connected with the block, and the piston, the cylinder, and the head defining a combustion chamber. The method may include pressurizing air, supplying the air to an intake manifold, maintaining fluid communication between the combustion chamber and the intake manifold during a portion of an intake stroke and through a predetermined portion of a compression stroke, and supplying a pressurized fuel directly to the combustion chamber during a portion of an combustion stroke.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
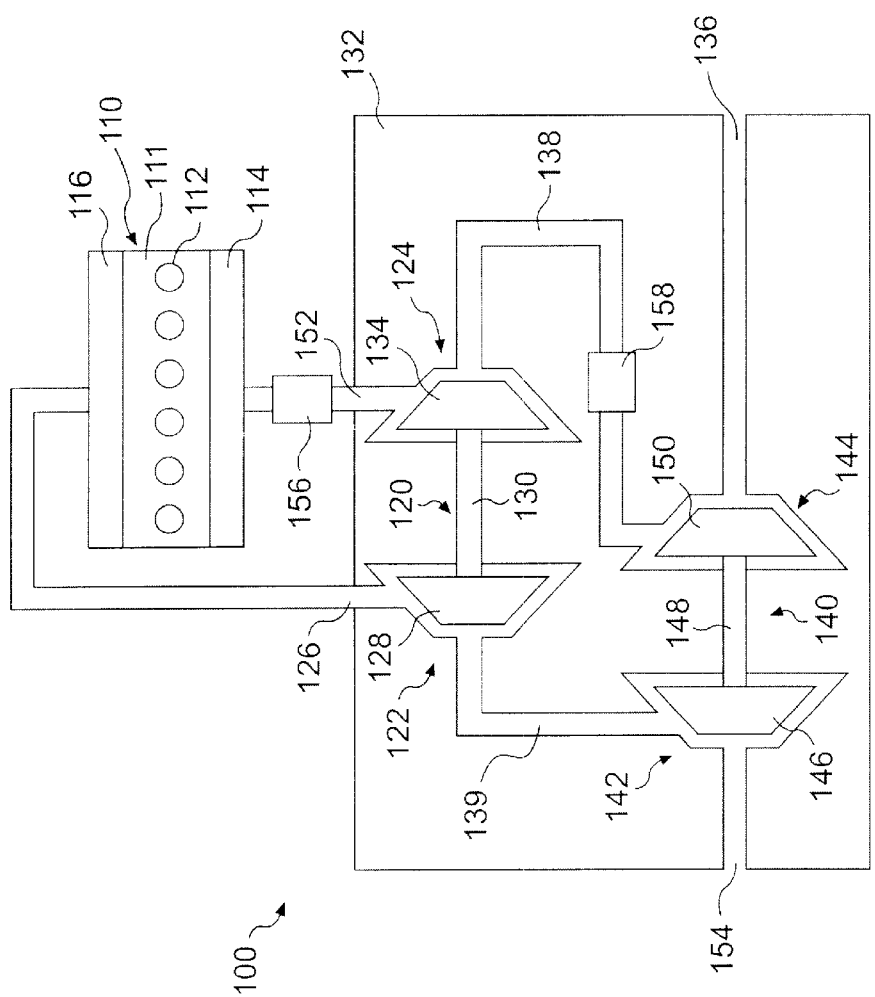
FIG. 1 is a combination diagrammatic and schematic illustration of an exemplary air supply system for an internal combustion engine in accordance with the invention.

Referring to FIG. 1, an exemplary air supply system 100 for an internal combustion engine 110, for example, a four-stroke, diesel engine, is provided. The internal combustion engine 110 includes an engine block 111 defining a plurality of combustion cylinders 112, the number of which depends upon the particular application. For example, a 4-cylinder engine would include four combustion cylinders, a 6-cylinder engine would include six combustion cylinders, etc. In the exemplary embodiment of FIG. 1, six combustion cylinders 112 are shown. It should be appreciated that the engine 110 may be any other type of internal combustion engine, for example, a gasoline or natural gas engine.

The internal combustion engine 110 also includes an intake manifold 114 and an exhaust manifold 116. The intake manifold 114 provides fluid, for example, air or a fuel/air mixture, to the combustion cylinders 112. The exhaust manifold 116 receives exhaust fluid, for example, exhaust gas, from the combustion cylinders 112. The intake manifold 114 and the exhaust manifold 116 are shown as a single-part construction for simplicity in the drawing. However, it should be appreciated that the intake manifold 114 and/or the exhaust manifold 116 may be constructed as multi-part manifolds, depending upon the particular application.

The air supply system 100 includes a first turbocharger 120 and may include a second turbocharger 140. The first and second turbochargers 120, 140 may be arranged in series with one another such that the second turbocharger 140 provides a first stage of pressurization and the first turbocharger 120 provides a second stage of pressurization. For example, the second turbocharger 140 may be a low pressure turbocharger and the first turbocharger 120 may be a high pressure turbocharger. The first turbocharger 120 includes a turbine 122 and a compressor 124. The turbine 122 is fluidly connected to the exhaust manifold 116 via an exhaust duct 126. The turbine 122 includes a turbine wheel 128 carried by a shaft 130, which in turn may be rotatably carried by a housing 132, for example, a single-part or multi-part housing. The fluid flow path from the exhaust manifold 116 to the turbine 122 may include a variable nozzle (not shown) or other variable geometry arrangement adapted to control the velocity of exhaust fluid impinging on the turbine wheel 128.

The compressor 124 includes a compressor wheel 134 carried by the shaft 130. Thus, rotation of the shaft 130 by the turbine wheel 128 in turn may cause rotation of the compressor wheel 134.

The first turbocharger 120 may include a compressed air duct 138 for receiving compressed air from the second turbocharger 140 and an air outlet line 152 for receiving compressed air from the compressor 124 and supplying the compressed air to the intake manifold 114 of the engine 110. The first turbocharger 120 may also include an exhaust duct 139 for receiving exhaust fluid from the turbine 122 and supplying the exhaust fluid to the second turbocharger 140.

The second turbocharger 140 may include a turbine 142 and a compressor 144. The turbine 142 may be fluidly connected to the exhaust duct 139. The turbine 142 may include a turbine wheel 146 carried by a shaft 148, which in turn may be rotatably carried by the housing 132. The compressor 144 may include a compressor wheel 150 carried by the shaft 148. Thus, rotation of the shaft 148 by the turbine wheel 146 may in turn cause rotation of the compressor wheel 150.

The second turbocharger 140 may include an air intake line 136 providing fluid communication between the atmosphere and the compressor 144. The second turbocharger 140 may also supply compressed air to the first turbocharger 120 via the compressed air duct 138. The second turbocharger 140 may include an exhaust outlet 154 for receiving exhaust fluid from the turbine 142 and providing fluid communication with the atmosphere. In an embodiment, the first turbocharger 120 and second turbocharger 140 may be sized to provide substantially similar compression ratios. For example, the first turbocharger 120 and second turbocharger 140 may both provide compression ratios of between 2 to 1 and 3 to 1, resulting in a system compression ratio of at least 4:1 with respect to atmospheric pressure. Alternatively, the second turbocharger 140 may provide a compression ratio of 3 to 1 and the first turbocharger 120 may provide a compression ratio of 1.5 to 1, resulting in a system compression ratio of 4.5 to 1 with respect to atmospheric pressure.

The air supply system 100 may include an air cooler 156, for example, an aftercooler, between the compressor 124 and the intake manifold 114. The air cooler 156 may extract heat from the air to lower the intake manifold temperature and increase the air density. Optionally, the air supply system 100 may include an additional air cooler 158, for example, an intercooler, between the compressor 144 of the second turbocharger 140 and the compressor 124 of the first turbocharger 120. Alternatively, the air supply system 100 may optionally include an additional air cooler (not shown) between the air cooler 156 and the intake manifold 114. The optional additional air cooler may further reduce the intake manifold temperature.

Figure 2:
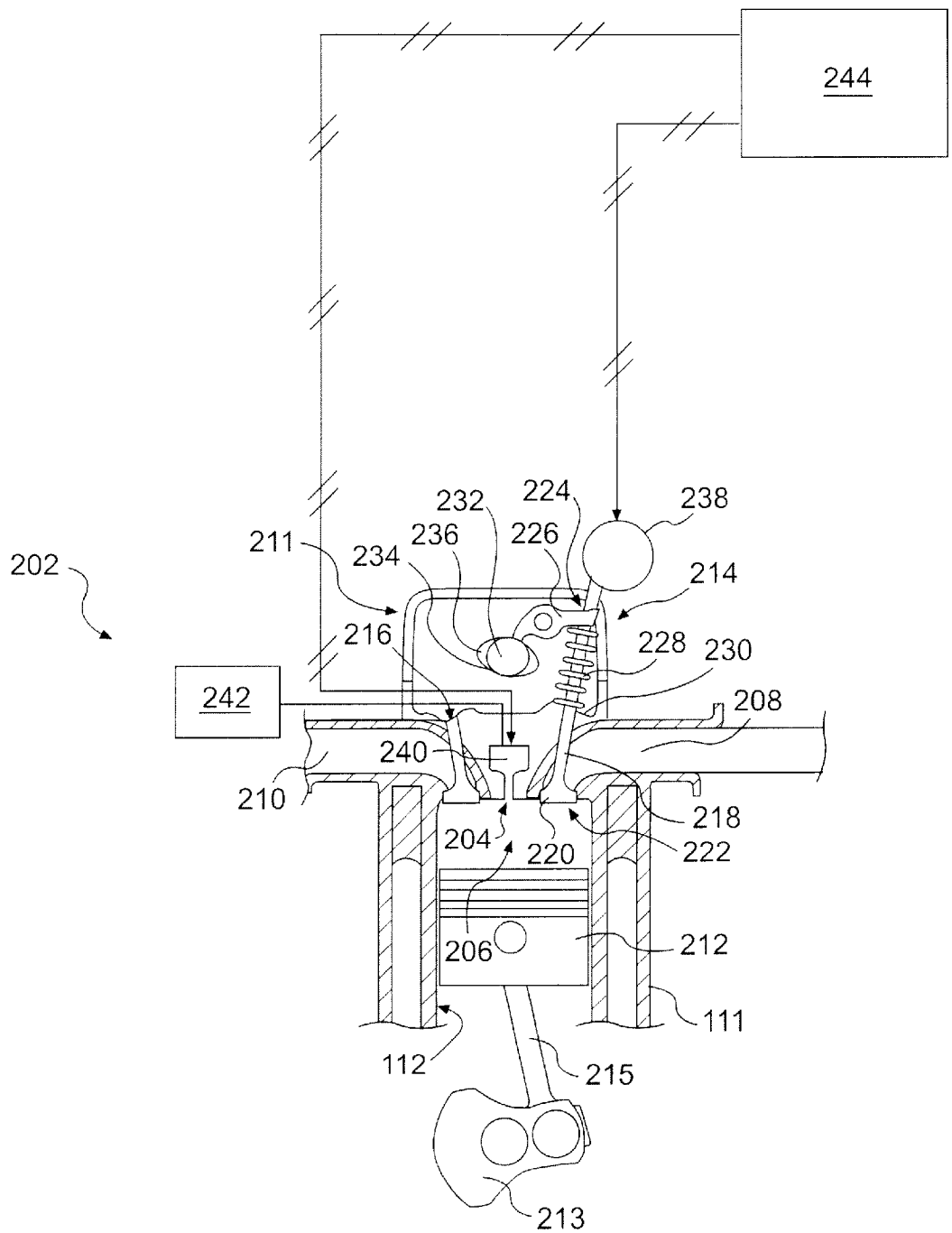
FIG. 2 is a combination diagrammatic and schematic illustration of an exemplary engine cylinder in accordance with the invention.

Referring now to FIG. 2, a cylinder head 211 may be connected with the engine block 111. Each cylinder 112 in the cylinder head 211 may be provided with a fuel supply system 202. The fuel supply system 202 may include a fuel port 204 opening to a combustion chamber 206 within the cylinder 112. The fuel supply system 202 may inject fuel, for example, diesel fuel, directly into the combustion chamber 206.

The cylinder 112 may contain a piston 212 slidably movable in the cylinder. A crankshaft 213 may be rotatably disposed within the engine block 111. A connecting rod 215 may couple the piston 212 to the crankshaft 213 so that sliding motion of the piston 212 within the cylinder 112 results in rotation of the crankshaft 213. Similarly, rotation of the crankshaft 213 results in a sliding motion of the piston 212. For example, an uppermost position of the piston 212 in the cylinder 112 corresponds to a top dead center position of the crankshaft 213, and a lowermost position of the piston 212 in the cylinder 112 corresponds to a bottom dead center position of the crankshaft 213.

As one skilled in the art will recognize, the piston 212 in a conventional, four-stroke engine cycle reciprocates between the uppermost position and the lowermost position during a combustion (or expansion) stroke, an exhaust stroke, and intake stroke, and a compression stroke. Meanwhile, the crankshaft 213 rotates from the top dead center position to the bottom dead center position during the combustion stroke, from the bottom dead center to the top dead center during the exhaust stroke, from top dead center to bottom dead center during the intake stroke, and from bottom dead center to top dead center during the compression stroke. Then, the four-stroke cycle begins again. Each piston stroke correlates to about 180° of crankshaft rotation, or crank angle. Thus, the combustion stroke may begin at about 0° crank angle, the exhaust stroke at about 180°, the intake stroke at about 360°, and the compression stroke at about 540°.

The cylinder 112 may include at least one intake port 208 and at least one exhaust port 210, each opening to the combustion chamber 206. The intake port 208 may be opened and closed by an intake valve assembly 214, and the exhaust port 210 may be opened and closed by an exhaust valve assembly 216. The intake valve assembly 214 may include, for example, an intake valve 218 having a head 220 at a first end 222, with the head 220 being sized and arranged to selectively close the intake port 208. The second end 224 of the intake valve 218 may be connected to a rocker arm 226 or any other conventional valve-actuating mechanism. The intake valve 218 may be movable between a first position permitting flow from the intake manifold 114 to enter the combustion cylinder 112 and a second position substantially blocking flow from the intake manifold 114 to the combustion cylinder 112. A spring 228 may be disposed about the intake valve 218 to bias the intake valve 218 to the second, closed position.

A camshaft 232 carrying a cam 234 with one or more lobes 236 may be arranged to operate the intake valve assembly 214 cyclically based on the configuration of the cam 234, the lobes 236, and the rotation of the camshaft 232 to achieve a desired intake valve timing. The exhaust valve assembly 216 may be configured in a manner similar to the intake valve assembly 214 and may be operated by one of the lobes 236 of the cam 234. In an embodiment, the intake lobe 236 may be configured to operate the intake valve 218 in a conventional Otto or diesel cycle, whereby the intake valve 218 moves to the second position from between about 10° before bottom dead center of the intake stroke and about 10° after bottom dead center of the compression stroke. Alternatively, the intake valve assembly 214 and/or the exhaust valve assembly 216 may be operated hydraulically, pneumatically, electronically, or by any combination of mechanics, hydraulics, pneumatics, and/or electronics.

The intake valve assembly 214 may include a variable intake valve closing mechanism 238 structured and arranged to selectively interrupt cyclical movement of and extend the closing timing of the intake valve 218. The variable intake valve closing mechanism 238 may be operated hydraulically, pneumatically, electronically, mechanically, or any combination thereof. For example, the variable intake valve closing mechanism 238 may be selectively operated to supply hydraulic fluid, for example, at a low pressure or a high pressure, in a manner to resist closing of the intake valve 218 by the bias of the spring 228. That is, after the intake valve 218 is lifted, i.e., opened, by the cam 234, and when the cam 234 is no longer holding the intake valve 218 open, the hydraulic fluid may hold the intake valve 218 open for a desired period. The desired period may change depending on the desired performance of the engine 110. Thus, the variable intake valve closing mechanism 238 enables the engine 110 to operate under a conventional Otto or diesel cycle or under a variable late closing Miller cycle.

Figure 4:
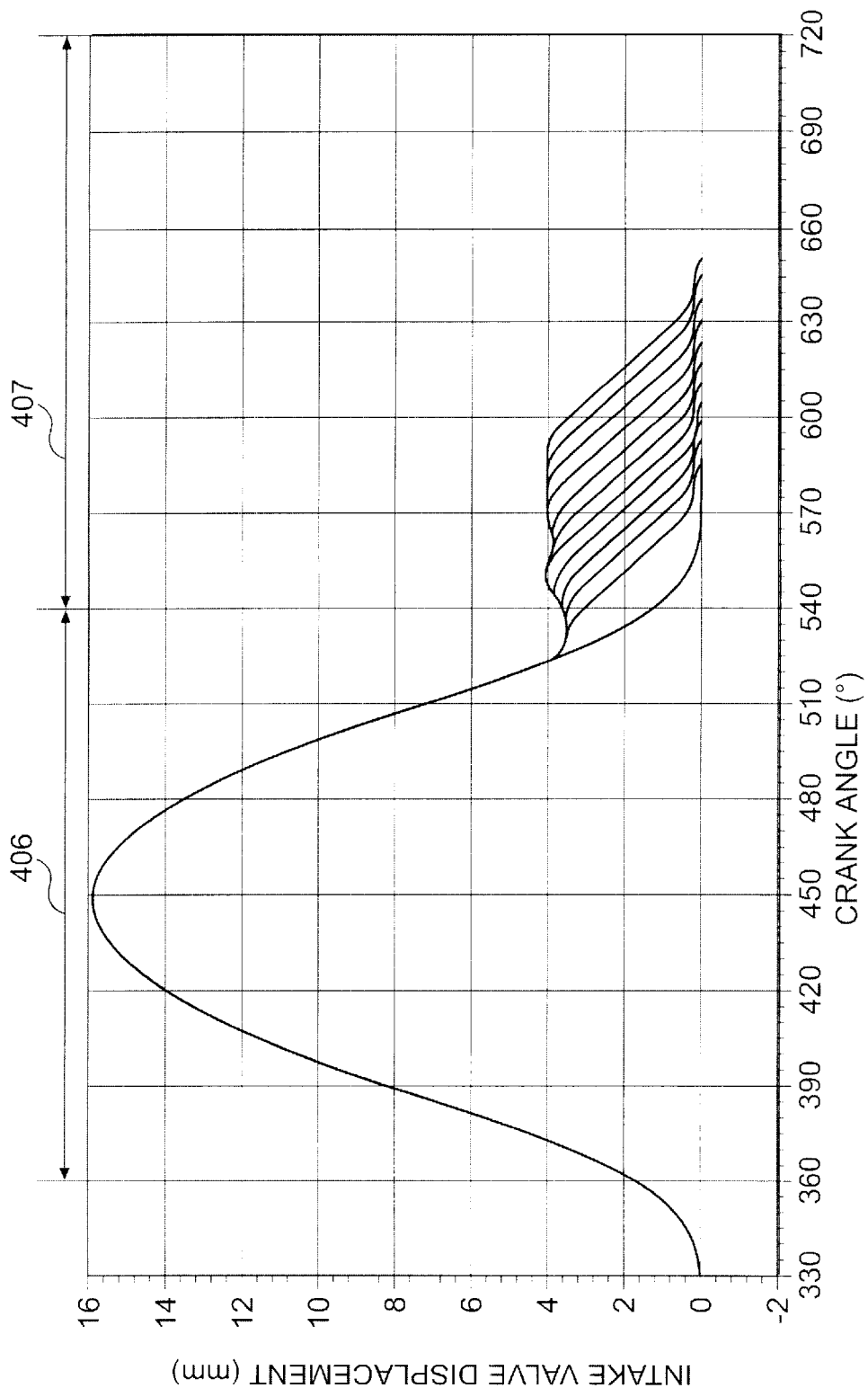
FIG. 4 is a graph illustrating an exemplary intake valve actuation as a function of engine crank angle in accordance with the present invention.

As shown in FIG. 4, the intake valve 218 may begin to open at about 360° crank angle, that is, when the crankshaft 213 is at or near a top dead center position of an intake stroke 406. The closing of the intake valve 218 may be selectively varied from about 540° crank angle, that is, when the crank shaft is at or near a bottom dead center position of a compression stroke 407, to about 650° crank angle, that is, about 70° before top center of the combustion stroke 508. Thus, the intake valve 218 may be held open for a majority portion of the compression stroke 407, that is, for the first half of the compression stroke 407 and a portion of the second half of the compression stroke 407.

The fuel supply system 202 may include a fuel injector assembly 240, for example, a mechanically-actuated, electronically-controlled unit injector, in fluid communication with a common fuel rail 242. Alternatively, the fuel injector assembly 240 may be any common rail type injector and may be actuated and/or operated hydraulically, mechanically, electrically, piezo-electrically, or any combination thereof. The common fuel rail 242 provides fuel to the fuel injector assembly 240 associated with each cylinder 112. The fuel injector assembly 240 may inject or otherwise spray fuel into the cylinder 112 via the fuel port 204 in accordance with a desired timing.

A controller 244 may be electrically connected to the variable intake valve closing mechanism 238 and/or the fuel injector assembly 240. The controller 244 may be configured to control operation of the variable intake valve closing mechanism 238 and/or the fuel injector assembly 240 based on one or more engine conditions, for example, engine speed, load, pressure, and/or temperature in order to achieve a desired engine performance. It should be appreciated that the functions of the controller 244 may be performed by a single controller or by a plurality of controllers. Similarly, spark timing in a natural gas engine may provide a similar function to fuel injector timing of a compression ignition engine.

Figure 3:
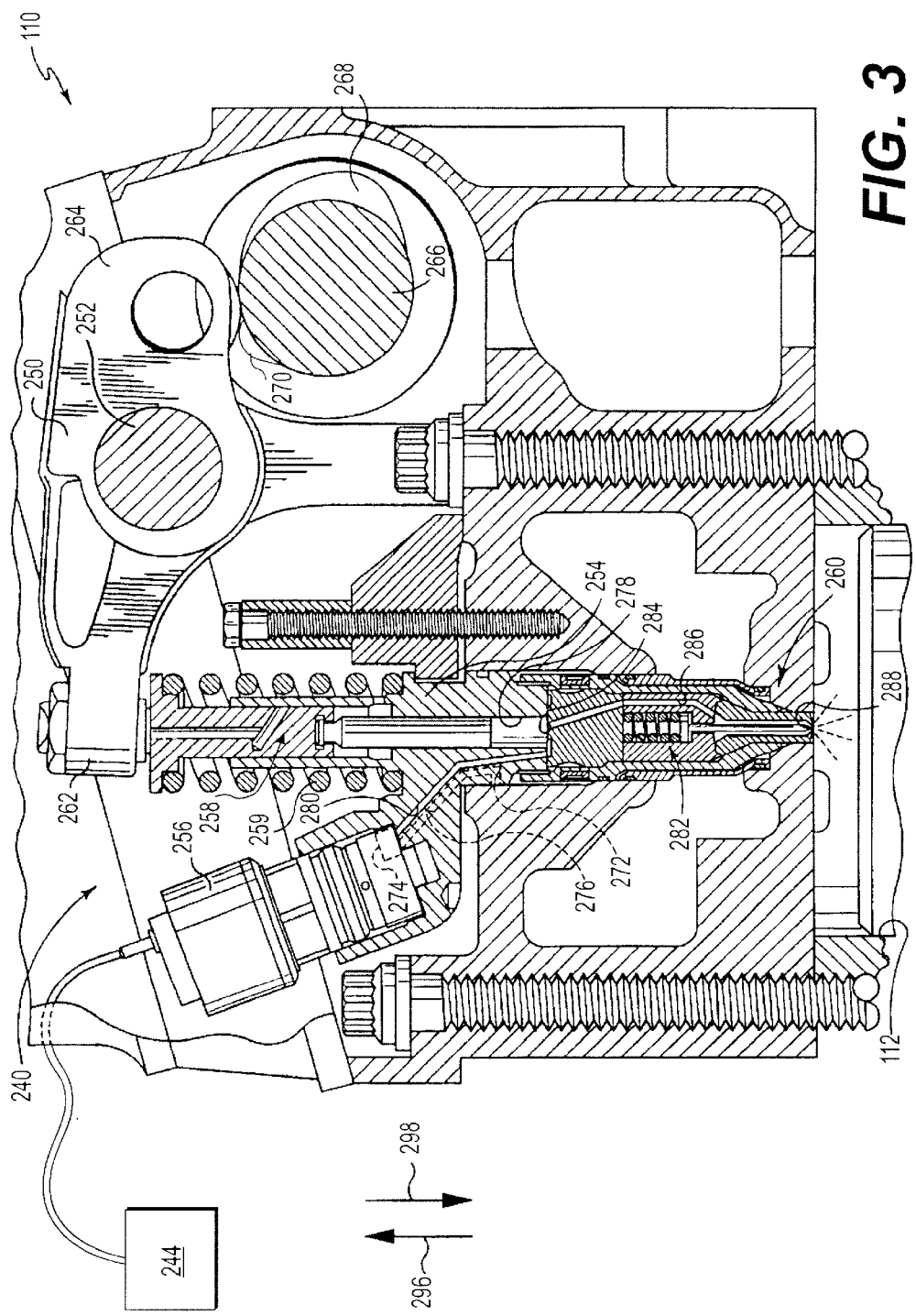
FIG. 3 is a diagrammatic sectional view of the exemplary engine cylinder of FIG. 2.

Referring now to FIG. 3, each fuel injector assembly 240 may be associated with an injector rocker arm 250 pivotally coupled to a rocker shaft 252. Each fuel injector assembly 240 may include an injector body 254, a solenoid 256, a plunger assembly 258, and an injector tip assembly 260. A first end 262 of the injector rocker arm 250 may be operatively coupled to the plunger assembly 258. The plunger assembly 258 may be biased by a spring 259 toward the first end 262 of the injector rocker arm 250 in the general direction of arrow 296.

A second end 264 of the injector rocker arm 250 may be operatively coupled to a camshaft 266. More specifically, the camshaft 266 may include a cam lobe 267 having a first bump 268 and a second bump 270. The camshafts 232, 266 and their respective lobes 236, 267 may be combined into a single camshaft (not shown) if desired. The bumps 268, 270 may be moved into and out of contact with the second end 264 of the injector rocker arm 250 during rotation of the camshaft 266. The bumps 268, 270 may be structured and arranged such that the second bump 270 may provide a pilot injection of fuel at a predetermined crank angle before the first bump 268 provides a main injection of fuel. It should be appreciated that the cam lobe 267 may have only a first bump 268 that injects all of the fuel per cycle.

When one of the bumps 268, 270 is rotated into contact with the injector rocker arm 250, the second end 264 of the injector rocker arm 250 is urged in the general direction of arrow 296. As the second end 264 is urged in the general direction of arrow 296, the rocker arm 250 pivots about the rocker shaft 252 thereby causing the first end 262 to be urged in the general direction of arrow 298. The force exerted on the second end 264 by the bumps 268, 270 is greater in magnitude than the bias generated by the spring 259, thereby causing the plunger assembly 258 to be likewise urged in the general direction of arrow 298. When the camshaft 266 is rotated beyond the maximum height of the bumps 268, 270, the bias of the spring 259 urges the plunger assembly 258 in the general direction of arrow 296. As the plunger assembly 258 is urged in the general direction of arrow 296, the first end 262 of the injector rocker arm 250 is likewise urged in the general direction of arrow 296, which causes the injector rocker arm 250 to pivot about the rocker shaft 252 thereby causing the second end 264 to be urged in the general direction of arrow 298.

The injector body 254 defines a fuel port 272. Fuel, such as diesel fuel, may be drawn or otherwise aspirated into the fuel port 272 from the fuel rail 242 when the plunger assembly 258 is moved in the general direction of arrow 296. The fuel port 272 is in fluid communication with a fuel valve 274 via a first fuel channel 276. The fuel valve 274 is, in turn in fluid communication with a plunger chamber 278 via a second fuel channel 280.

The solenoid 256 may be electrically coupled to the controller 244 and mechanically coupled to the fuel valve 274. Actuation of the solenoid 256 by a signal from the controller 244 may cause the fuel valve 274 to be switched from an open position to a closed position. When the fuel valve 274 is positioned in its open position, fuel may advance from the fuel port 272 to the plunger chamber 278, and vice versa. However, when the fuel valve 274 is positioned in its closed positioned, the fuel port 272 is isolated from the plunger chamber 278.

The injector tip assembly 260 may include a check valve assembly 282. Fuel may be advanced from the plunger chamber 278, through an inlet orifice 284, a third fuel channel 286, an outlet orifice 288, and into the cylinder 112 of the engine 110.

Thus, it should be appreciated that when one of the bumps 268, 270 is not in contact with the injector rocker arm 16, the plunger assembly 258 is urged in the general direction of arrow 296 by the spring 259 thereby causing fuel to be drawn into the fuel port 272 which in turn fills the plunger chamber 278 with fuel. As the camshaft 266 is further rotated, one of the bumps 268, 270 is moved into contact with the rocker arm 250, thereby causing the plunger assembly 258 to be urged in the general direction of arrow 298. If the controller 244 is not generating an injection signal, the fuel valve 274 remains in its open position, thereby causing the fuel which is in the plunger chamber 278 to be displaced by the plunger assembly 258 through the fuel port 272. However, if the controller 244 is generating an injection signal, the fuel valve 274 is positioned in its closed position thereby isolating the plunger chamber 278 from the fuel port 272. As the plunger assembly 258 continues to be urged in the general direction of arrow 298 by the camshaft 266, fluid pressure within the fuel injector assembly 240 increases. At a predetermined pressure magnitude, for example, at about 5500 psi (38 MPa), fuel is injected into the cylinder 112. Fuel will continue to be injected into the cylinder 112 until the controller 244 signals the solenoid 256 to return the fuel valve 274 to its open position.

Figure 5:
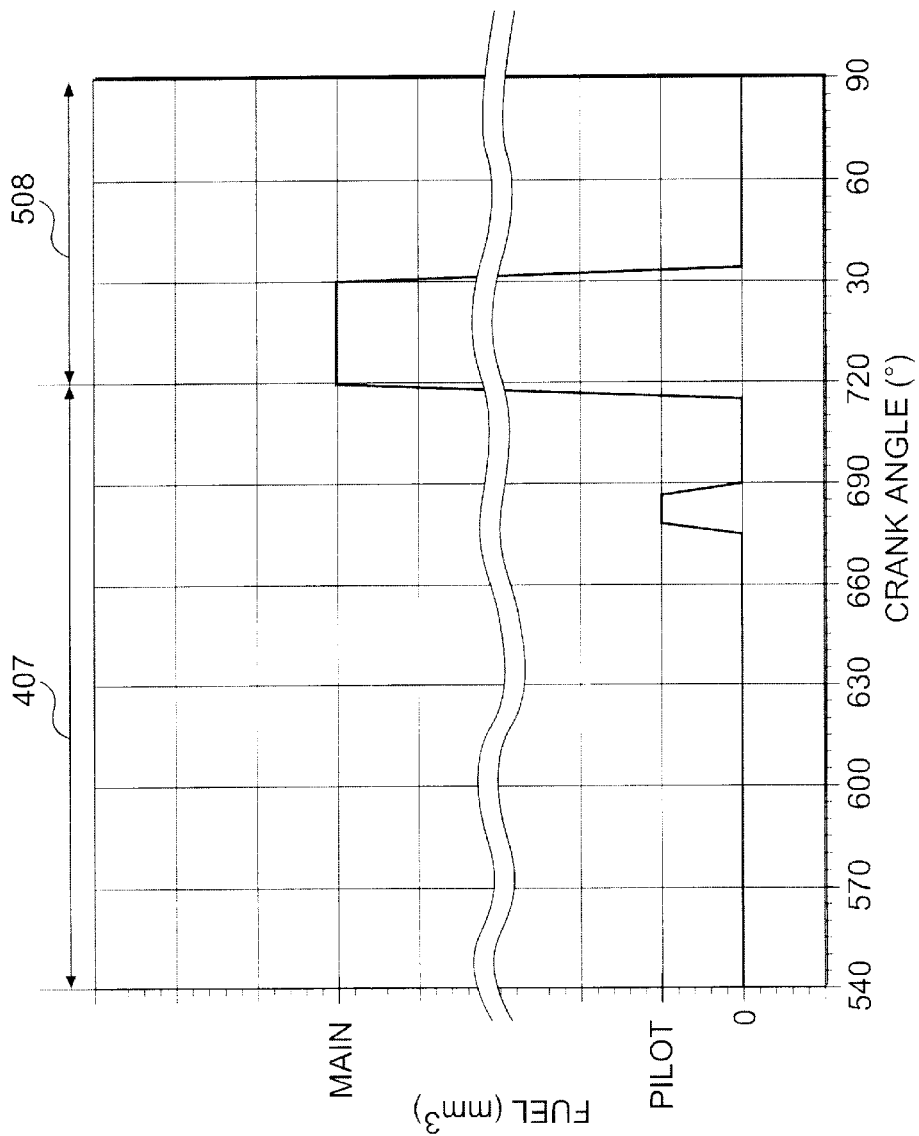
FIG. 5 is a graph illustrating an exemplary fuel injection as a function of engine crank angle in accordance with the present invention.

As shown in the exemplary graph of FIG. 5, the pilot injection of fuel may commence when the crankshaft 213 is at about 675° crank angle, that is, about 45° before top dead center of the compression stroke 407. The main injection of fuel may occur when the crankshaft 213 is at about 710° crank angle, that is, about 10° before top dead center of the compression stroke 407 and about 45° after commencement of the pilot injection. Generally, the pilot injection may commence when the crankshaft 213 is about 40–50° before top dead center of the compression stroke 407 and may last for about 10–15° crankshaft rotation. The main injection may commence when the crankshaft 213 is between about 10° before top dead center of the compression stroke 407 and about 12° after top dead center of the combustion stroke 508. The main injection may last for about 20–45° crankshaft rotation.

Figure 6:
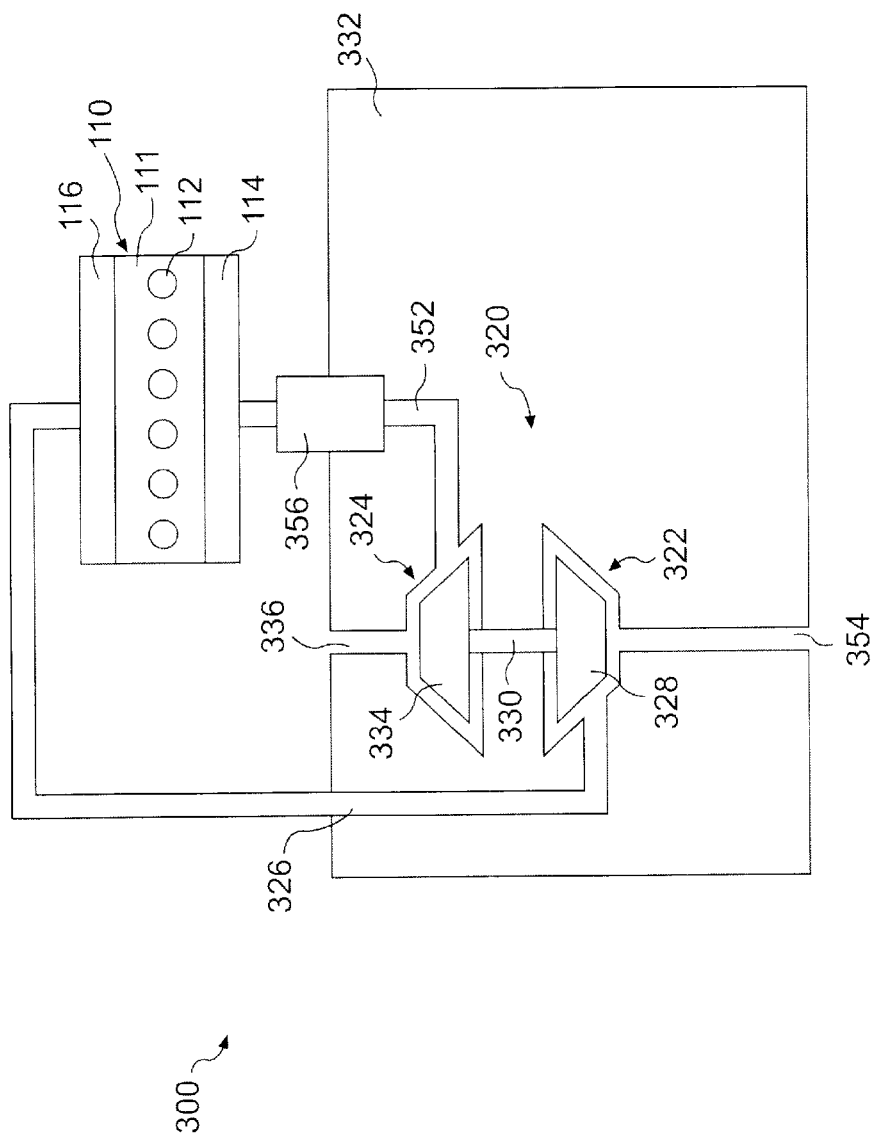
FIG. 6 is a combination diagrammatic and schematic illustration of another exemplary air supply system for an internal combustion engine in accordance with the invention.

FIG. 6 is a combination diagrammatic and schematic illustration of a second exemplary air supply system 300 for the internal combustion engine 110. The air supply system 300 may include a turbocharger 320, for example, a high-efficiency turbocharger capable of producing at least about a 4 to 1 compression ratio with respect to atmospheric pressure. The turbocharger 320 may include a turbine 322 and a compressor 324. The turbine 322 may be fluidly connected to the exhaust manifold 116 via an exhaust duct 326. The turbine 322 may include a turbine wheel 328 carried by a shaft 330, which in turn may be rotatably carried by a housing 332, for example, a single-part or multi-part housing. The fluid flow path from the exhaust manifold 116 to the turbine 322 may include a variable nozzle (not shown), which may control the velocity of exhaust fluid impinging on the turbine wheel 328.

The compressor 324 may include a compressor wheel 334 carried by the shaft 330. Thus, rotation of the shaft 330 by the turbine wheel 328 in turn may cause rotation of the compressor wheel 334. The turbocharger 320 may include an air inlet 336 providing fluid communication between the atmosphere and the compressor 324 and an air outlet 352 for supplying compressed air to the intake manifold 114 of the engine 110. The turbocharger 320 may also include an exhaust outlet 354 for receiving exhaust fluid from the turbine 322 and providing fluid communication with the atmosphere.

The air supply system 300 may include an air cooler 356 between the compressor 324 and the intake manifold 114. Optionally, the air supply system 300 may include an additional air cooler (not shown) between the air cooler 356 and the intake manifold 114.

Figure 7:
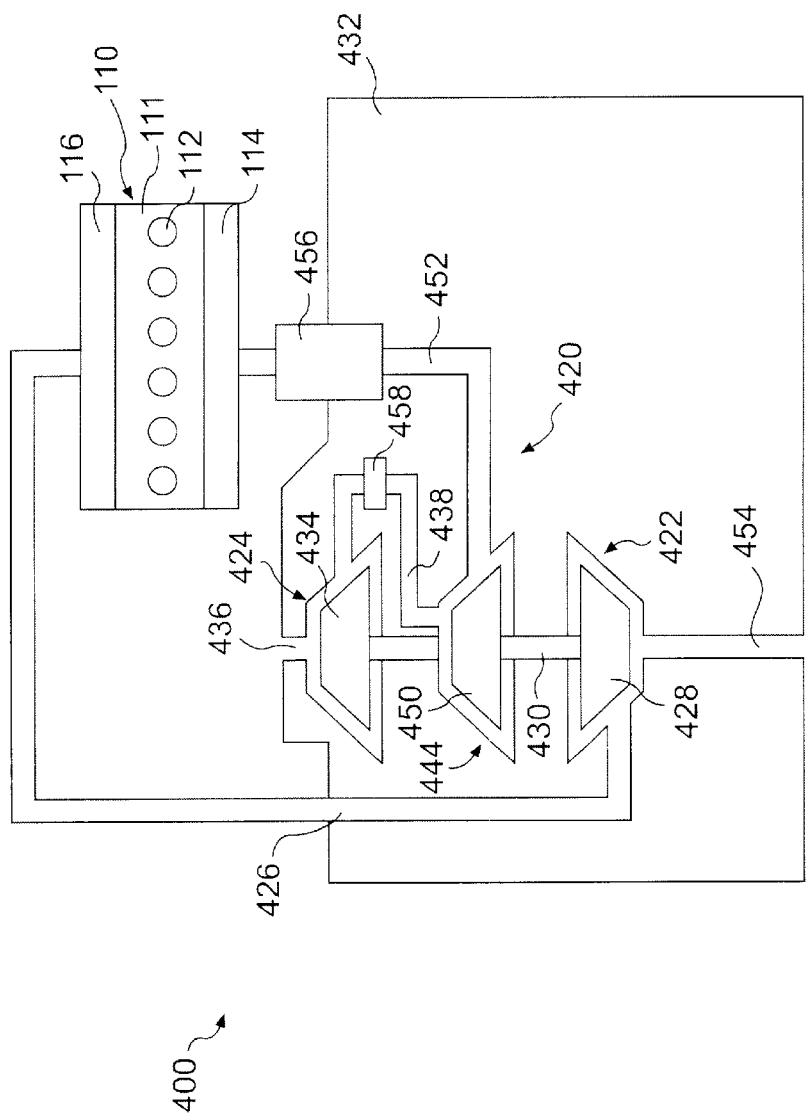
FIG. 7 is a combination diagrammatic and schematic illustration of yet another exemplary air supply system for an internal combustion engine in accordance with the invention.

FIG. 7 is a combination diagrammatic and schematic illustration of a third exemplary air supply system 400 for the internal combustion engine 110. The air supply system 400 may include a turbocharger 420, for example, a turbocharger 420 having a turbine 422 and two compressors 424, 444. The turbine 422 may be fluidly connected to the exhaust manifold 116 via an inlet duct 426. The turbine 422 may include a turbine wheel 428 carried by a shaft 430, which in turn may be rotatably carried by a housing 432, for example, a single-part or multi-part housing. The fluid flow path from the exhaust manifold 116 to the turbine 422 may include a variable nozzle (not shown), which may control the velocity of exhaust fluid impinging on the turbine wheel 428.

The first compressor 424 may include a compressor wheel 434 carried by the shaft 430, and the second compressor 444 may include a compressor wheel 450 carried by the shaft 430. Thus, rotation of the shaft 430 by the turbine wheel 428 in turn may cause rotation of the first and second compressor wheels 434, 450. The first and second compressors 424, 444 may provide first and second stages of pressurization, respectively.

The turbocharger 420 may include an air intake line 436 providing fluid communication between the atmosphere and the first compressor 424 and a compressed air duct 438 for receiving compressed air from the first compressor 424 and supplying the compressed air to the second compressor 444. The turbocharger 420 may include an air outlet line 452 for supplying compressed air from the second compressor 444 to the intake manifold 114 of the engine 110. The turbocharger 420 may also include an exhaust outlet 454 for receiving exhaust fluid from the turbine 422 and providing fluid communication with the atmosphere.

For example, the first compressor 424 and second compressor 444 may both provide compression ratios of between 2 to 1 and 3 to 1, resulting in a system compression ratio of at least 4:1 with respect to atmospheric pressure. Alternatively, the second compressor 444 may provide a compression ratio of 3 to 1 and the first compressor 424 may provide a compression ratio of 1.5 to 1, resulting in a system compression ratio of 4.5 to 1 with respect to atmospheric pressure.

The air supply system 400 may include an air cooler 456 between the compressor 424 and the intake manifold 114. Optionally, the air supply system 400 may include an additional air cooler 458 between the first compressor 424 and the second compressor 444 of the turbocharger 420. Alternatively, the air supply system 400 may optionally include an additional air cooler (not shown) between the air cooler 456 and the intake manifold 114.

Industrial Applicability

During use, the internal combustion engine 110 operates in a known manner using, for example, the diesel principle of operation. Referring to the exemplary air supply system shown in FIG. 1, exhaust gas from the internal combustion engine 110 is transported from the exhaust manifold 116 through the inlet duct 126 and impinges on and causes rotation of the turbine wheel 128. The turbine wheel 128 is coupled with the shaft 130, which in turn carries the compressor wheel 134. The rotational speed of the compressor wheel 134 thus corresponds to the rotational speed of the shaft 130.

The exemplary fuel supply system 200 and cylinder 112 shown in FIG. 2 may be used with each of the exemplary air supply systems 100, 300, 400. Compressed air is supplied to the combustion chamber 206 via the intake port 208, and exhaust air exits the combustion chamber 206 via the exhaust port 210. The intake valve assembly 214 and the exhaust valve assembly 216 may be controllably operated to direct airflow into and out of the combustion chamber 206.

In a conventional Otto or diesel cycle mode, the intake valve 218 moves from the second position to the first position in a cyclical fashion to allow compressed air to enter the combustion chamber 206 of the cylinder 112 at near top center of the intake stroke 406 (about 360° crank angle), as shown in FIG. 4. At near bottom dead center of the compression stroke (about 540° crank angle), the intake valve 218 moves from the first position to the second position to block additional air from entering the combustion chamber 206. Fuel may then be injector from the fuel injector assembly 240 at near top dead center of the compression stroke (about 720° crank angle).

In a conventional Miller cycle engine, the conventional Otto or diesel cycle is modified by moving the intake valve 218 from the first position to the second position at either some predetermined time before bottom dead center of the intake stroke 406 (i.e., before 540° crank angle) or some predetermined time after bottom dead center of the compression stroke 407 (i.e., after 540° crank angle). In a conventional late-closing Miller cycle, the intake valve 218 is moved from the first position to the second position during a first portion of the first half of the compression stroke 407.

The variable intake valve closing mechanism 238 enables the engine 110 to be operated in both a late-closing Miller cycle and a conventional Otto or diesel cycle. Further, injecting a substantial portion of fuel after top dead center of the combustion stroke 508, as shown in FIG. 5, may reduce $NO_x$ emissions and increase the amount of energy rejected to the exhaust manifold 116 in the form of exhaust fluid. Use of a high-efficiency turbocharger 320, 420 or series turbochargers 120, 140 may enable recapture of at least a portion of the rejected energy from the exhaust. The rejected energy may be converted into increased air pressures delivered to the intake manifold 114, which may increase the energy pushing the piston 212 against the crankshaft 213 to produce useable work. In addition, delaying movement of the intake valve 218 from the first position to the second position may reduce the compression temperature in the combustion chamber 206. The reduced compression temperature may further reduce $NO_x$ emissions.

The controller 244 may operate the variable intake valve closing mechanism 238 to vary the timing of the intake valve assembly 214 to achieve desired engine performance based on one or more engine conditions, for example, engine speed, engine load, engine temperature, boost, and/or manifold intake temperature. The variable intake valve closing mechanism 238 may also allow more precise control of the air/fuel ratio. By delaying closing of the intake valve assembly 214, the controller 244 may control the cylinder pressure during the compression stroke of the piston 212. For example, late closing of the intake valve reduces the compression work that the piston 212 must perform without compromising cylinder pressure and while maintaining a standard expansion ratio and a suitable air/fuel ratio.

The high pressure air provided by the exemplary air supply systems 100, 300, 400 may provide extra boost on the induction stroke of the piston 212. The high pressure may also enable the intake valve assembly 214 to be closed even later than in a conventional Miller cycle engine. In the present invention, the intake valve assembly 214 may remain open until the second half of the compression stroke of the piston 212, for example, as late as about 80° to 70° before top dead center (BTDC). While the intake valve assembly 214 is open, air may flow between the chamber 206 and the intake manifold 114. Thus, the cylinder 112 experiences less of a temperature rise in the chamber 206 during the compression stroke of the piston 212.

Since the closing of the intake valve assembly 214 may be delayed, the timing of the fuel supply system may also be retarded. For example, the controller 244 may controllably operate the fuel injector assembly 240 to supply fuel to the combustion chamber 206 after the intake valve assembly 214 is closed. For example, the fuel injector assembly 240 may be controlled to supply a pilot injection of fuel contemporaneous with or slightly after the intake valve assembly 214 is closed and to supply a main injection of fuel contemporaneous with or slightly before combustion temperature is reached in the chamber 206. As a result, a significant amount of exhaust energy may be available for recirculation by the air supply system 100, 300, 400, which may efficiently extract additional work from the exhaust energy.

Referring to the exemplary air supply system 100 of FIG. 1, the second turbocharger 140 may extract otherwise wasted energy from the exhaust stream of the first turbocharger 120 to turn the compressor wheel 150 of the second turbocharger 140, which is in series with the compressor wheel 134 of the first turbocharger 120. The extra restriction in the exhaust path resulting from the addition of the second turbocharger 140 may raise the back pressure on the piston 212. However, the energy recovery accomplished through the second turbocharger 140 may offset the work consumed by the higher back pressure. For example, the additional pressure achieved by the series turbochargers 120, 140 may do work on the piston 212 during the induction stroke of the combustion cycle. Further, the added pressure on the cylinder resulting from the second turbocharger 140 may be controlled and/or relieved by using the late intake valve closing. Thus, the series turbochargers 120, 140 may provide fuel efficiency via the air supply system 100, and not simply more power It should be appreciated that the air cooler 156, 356, 456 preceding the intake manifold 114 may extract heat from the air to lower the inlet manifold temperature, while maintaining the denseness of the pressurized air. The optional additional air cooler between compressors or after the air cooler 156, 356, 456 may further reduce the inlet manifold temperature, but may lower the work potential of the pressurized air. The lower inlet manifold temperature may reduce the $NO_x$ emissions.

An air and fuel supply system for an internal combustion engine in accordance with the exemplary embodiments of the invention may extract additional work from the engine's exhaust. The system may also achieve fuel efficiency and reduced $NO_x$ emissions, while maintaining work potential and ensuring that the system reliability meets with operator expectations.

It will be apparent to those skilled in the art that various modifications and variations can be made in the disclosed air and fuel supply system for an internal combustion engine without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A method of operating an internal combustion engine including at least one cylinder and a piston slidable in the cylinder, the method comprising:
   supplying pressurized air from an intake manifold to an air intake port of a combustion chamber in the cylinder;
   selectively operating an air intake valve to open the air intake port to allow pressurized air to flow between the combustion chamber and the intake manifold substantially during a majority portion of a compression stroke of the piston; and
   operably controlling a fuel supply system to inject fuel into the combustion chamber after the intake valve is closed.

2. The method of claim 1, wherein said selectively operating includes operating a variable intake valve closing mechanism to keep the intake valve open.

3. The method of claim 2, wherein the variable intake valve closing mechanism is operated at least one of hydraulically, pneumatically, mechanically, and electronically.

4. The method of claim 1, wherein the selective operation of the air intake valve is based on at least one engine condition.

5. The method of claim 1, wherein said selectively operating includes operating the intake valve to remain open for a portion of a second half of the compression stroke of the piston.

6. The method of claim 1, wherein said operably controlling a fuel supply system includes operating a fuel injector assembly at least one of hydraulically, mechanically, and electronically.

7. A method of operating an internal combustion engine including at least one cylinder and a piston slidable in the cylinder, the method comprising:
   imparting rotational movement to a first turbine and a first compressor of a first turbocharger with exhaust air flowing from an exhaust port of the cylinder;
   imparting rotational movement to a second turbine and a second compressor of a second turbocharger with exhaust air flowing from an exhaust duct of the the first turbocharger;
   compressing air drawn from atmosphere with the second compressor;
   compressing air received from the second compressor with the first compressor;
   supplying pressurized air from the first compressor to an air intake port of a combustion chamber in the cylinder via an intake manifold;
   controllably operating a fuel supply system to inject fuel directly into the combustion chamber; and
   selectively operating an air intake valve to open the air intake port to allow pressurized air to flow between the combustion chamber and the intake manifold during a portion of a compression stroke of the piston,
   wherein fuel is injected during a combustion stroke.

8. The method of claim 7, wherein fuel injection begins during the compression stroke.

9. The method of claim 7, wherein said selectively operating includes operating a variable intake valve closing mechanism to interrupt cyclical movement of the intake valve.

10. The method of claim 7, wherein the selective operation of the air intake valve is based on at least one engine condition.

11. The method of claim 7, wherein said selectively operating includes operating the intake valve to remain open for a portion of a second half of he compression stroke of the piston.

12. The method of claim 7, wherein said controllably operating a fuel supply system includes operating a fuel injector assembly at least one of hydraulically, mechanically, and electronically.

13. An internal combustion engine, comprising:
   a block defining at least one cylinder;
   a head connected with said block, said head having an air intake port and an exhaust port;
   a piston slidable in each cylinder;
   an air intake valve controllably movable to open and close the air intake port;
   a first turbocharger including a first turbine coupled with a first compressor, the first turbine being in fluid communication with the exhaust port, the first compressor being in fluid communication with the air intake port;

a second compressor being in fluid communication with atmosphere and the first compressor;

a fuel supply system operable to controllably inject fuel into the combustion chamber; and a controller configured to selectively operate the air intake valve to remain open during a portion of a compression stroke of the piston, wherein the controller is configured to inject fuel into the combustion chamber during an combustion stroke.

14. The engine of claim 13, wherein said second compressor is coupled with said first turbine.

15. The engine of claim 13, wherein the controller is configured to operate the intake valve to remain open for a portion of a second half of the compression stroke of the piston.

16. The engine of claim 13, wherein the fuel supply system includes a fuel injector assembly.

17. An internal combustion engine, comprising:

a block defining at least one cylinder;

a head connected with said block, said head having an air intake port and an exhaust port;

a piston slidable in each cylinder;

an air intake valve assembly connectable with a cam assembly to controllably move an intake valve to open and close the air intake port;

a first turbocharger including a first turbine coupled with a first compressor, the first turbine being in fluid communication with the exhaust port and an exhaust duct, the first compressor being in fluid communication with the air intake port;

a second turbocharger including a second turbine coupled with a second compressor, the second turbine being in fluid communication with the exhaust duct of the first turbocharger and atmosphere, the second compressor being in fluid communication with atmosphere and the first compressor;

a fuel supply system connectable with a cam assembly operable to controllably inject fuel into the combustion chamber; and a variable intake valve mechanism connectable with said air intake valve, said variable intake valve mechanism being adaptable to interrupt cyclical movement of said intake valve, wherein said cam assembly for said fuel system includes a cam lobe having a first bump and a second bump.

18. The engine of claim 17, wherein said first turbocharger and said second turbocharger are similarly sized.

19. The engine of claim 17, wherein said variable valve mechanism is actuated at least one of hydraulically, pneumatically, mechanically, and electronically.

20. The engine of claim 17, further including an air cooler between at least one of said first compressor and said second compressor.

21. A method of controlling an internal combustion engine having a variable compression ratio, said engine having a block defining a cylinder, a piston slidable in said cylinder, a head connected with said block, said piston, said cylinder, and said head defining a combustion chamber, the method comprising:

pressurizing air;

supplying said air to an intake manifold of the engine;

maintaining fluid communication between said combustion chamber and the intake manifold during a portion of an intake stroke and through a predetermined portion of a compression stroke; and supplying a pressurized fuel directly to the combustion chamber during a portion of a combustion stroke.

22. The method of claim 21, further including supplying the pressurized fuel during a portion of the compression stroke.

23. The method of claim 22, wherein supplying the pressurized fuel includes supplying a pilot injection at a predetermined crank angle before a main injection.

24. The method of claim 23, wherein said main injection begins during the compression stroke.

25. The method of claim 21, wherein said predetermined portion of the compression stroke is at least a majority of the compression stroke.

26. The method of claim 21, wherein said pressurizing includes a first stage of pressurization and a second stage of pressurization.

27. The method of claim 26, further including cooling air between said first stage of pressurization and said second stage of pressurization.

28. The method of claim 21, further including cooling the pressurized air.

29. A method of controlling an internal combustion engine having a variable compression ratio, said engine having a block defining a cylinder, a piston slidable in said cylinder, a head connected with said block, said piston, said cylinder, and said head defining a combustion chamber, the method comprising:

pressurizing air to a ratio of at least 4:1 with respect to atmospheric pressure;

supplying the pressurized air to an intake manifold of the engine;

maintaining fluid communication between the combustion chamber and the intake manifold during an intake stroke and a majority of a compression stroke; and supplying a fuel to the combustion chamber during at least a portion of the remaining compression stroke.

30. The method of claim 29, wherein said majority is at least 90 degrees crank angle after bottom dead center.

31. The method of claim 29, wherein said supplying fuel includes injecting a first portion of fuel a predetermined period prior to injecting a second portion of fuel.

32. The method of claim 31, wherein said injecting the second portion of fuel begins during the compression stroke and terminates during a combustion stroke.

33. The method of claim 31, further including cooling the air prior to supplying the air to the combustion chamber.

\* \* \* \* \*

US006688280C1

(12) INTER PARTES REEXAMINATION CERTIFICATE (0071st)

United States Patent
Weber et al.

(10) Number: US 6,688,280 C1
(45) Certificate Issued: Jun. 2, 2009

(54) AIR AND FUEL SUPPLY SYSTEM FOR COMBUSTION ENGINE

(75) Inventors: James Richard Weber, Lacon, IL (US); Scott A. Leman, Eureka, IL (US)

(73) Assignee: Caterpillar Inc., Peoria, IL (US)

Reexamination Request:
No. 95/000,050, Sep. 17, 2004
No. 90/007,885, Jan. 20, 2006

Reexamination Certificate for:
Patent No.: 6,688,280
Issued: Feb. 10, 2004
Appl. No.: 10/143,908
Filed: May 14, 2002

(51) Int. Cl.
*F02B 37/013* (2006.01)
*F02B 37/04* (2006.01)

(52) U.S. Cl. .............. 123/305; 123/316; 123/90.16; 123/90.12; 123/562; 60/612

(58) Field of Classification Search .......... None
See application file for complete search history.

(56) References Cited

U.S. PATENT DOCUMENTS

| | | | |
|---|---|---|---|
| 883,240 A | 3/1908 | Sabathe | |
| 982,251 A | 1/1911 | Coffee | |
| 1,033,939 A | 7/1912 | Robb et al. | |
| 1,316,977 A | 9/1919 | Ricardo | |
| 1,562,692 A | 11/1925 | DeRochefort-Lucay | |
| 1,610,888 A | 12/1926 | Sauer | |
| 1,629,327 A | 5/1927 | Waldo | |
| 1,781,147 A | 11/1930 | Zaikowsky | |
| 1,825,817 A | 10/1931 | Patterson | |
| 1,963,780 A | 6/1934 | DuBois | |
| 2,126,616 A | 8/1938 | Cayabyab | |
| 2,202,227 A | 5/1940 | Noland | |
| 2,292,233 A | 8/1942 | Lysholm | |
| 2,344,993 A | 3/1944 | Lysholm | |
| 2,391,176 A | 12/1945 | Mallory | |
| 2,400,247 A | 5/1946 | Miller et al. | |
| 2,453,377 A | 11/1948 | Lozivit | |
| 2,484,009 A | 10/1949 | Barber | |
| 2,484,109 A | 10/1949 | Meinecke | |
| 2,522,456 A | 9/1950 | Mallory | |
| 2,594,845 A | 4/1952 | Baumann | |
| 2,614,547 A | 10/1952 | Meinecke | |
| 2,633,698 A | 4/1953 | Nettel | |
| 2,644,436 A | 7/1953 | Berlyn | |
| 2,670,595 A | * 3/1954 | Miller | 123/297 |
| 2,739,440 A | 3/1956 | Seiffert et al. | |
| 2,768,615 A | 10/1956 | Taylor et al. | |
| 2,773,490 A | 12/1956 | Miller | |
| 2,780,053 A | 2/1957 | Cowland | |
| 2,780,912 A | 2/1957 | Miller | |
| 2,817,322 A | 12/1957 | Miller | |

(Continued)

FOREIGN PATENT DOCUMENTS

| | | |
|---|---|---|
| AT | 003 134 | 10/1999 |
| AT | 003 205 | 11/1999 |
| AU | B1-33 707/78 | 4/1982 |

(Continued)

OTHER PUBLICATIONS

Zappa, G. and Franca, T., "A–4–Stroke High Speed Diesel Engine With Two–Stage of Supercharging and Variable Compression Ratio," 13th International Congress on Combustion Engines (CIMAC), 1979, pp. D19–1–D19–22.

(Continued)

*Primary Examiner*—Matthew C. Graham

(57) ABSTRACT

A method of operating an internal combustion engine, including at least one cylinder and a piston slidable in the cylinder, may include supplying pressurized air from an intake manifold to an air intake port of a combustion chamber in the cylinder, selectively operating an air intake valve to open the air intake port to allow pressurized air to flow between the combustion chamber and the intake manifold substantially during a majority portion of a compression stroke of the piston, and operably controlling a fuel supply system to inject fuel into the combustion chamber after the intake valve is closed.

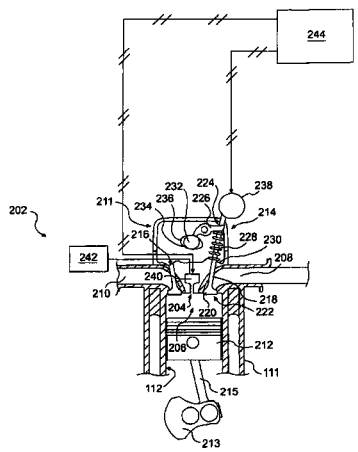

U.S. PATENT DOCUMENTS

| | | | |
|---|---|---|---|
| 2,832,324 A | 4/1958 | Barber | |
| 2,910,826 A | 11/1959 | Mansfield | |
| 2,991,616 A | 7/1961 | Miller | |
| 3,015,934 A | 1/1962 | Miller | |
| 3,029,594 A | 4/1962 | Miller | |
| 3,113,561 A | 12/1963 | Heintz | |
| 3,144,749 A | 8/1964 | Miller | |
| 3,180,327 A | 4/1965 | Neir | |
| 3,186,388 A | 6/1965 | Bricout | |
| 3,232,042 A | 2/1966 | Sarra | |
| 3,250,068 A | 5/1966 | Vulliamy | |
| 3,257,797 A | 6/1966 | Lieberherr | |
| 3,266,234 A | 8/1966 | Cook | |
| 3,336,911 A | 8/1967 | Steiger | |
| 3,355,877 A | 12/1967 | Chaffiotte | |
| 3,405,692 A | 10/1968 | Paschke | |
| 3,413,965 A | 12/1968 | Gavasso | |
| 3,416,502 A | 12/1968 | Weiss | |
| 3,591,958 A | 7/1971 | Nebgen | |
| 3,595,013 A | 7/1971 | Brille et al. | |
| 3,665,905 A | 5/1972 | Brille et al. | |
| 3,774,399 A | 11/1973 | Nohira et al. | |
| 3,795,231 A | 3/1974 | Brille | |
| 3,919,986 A | 11/1975 | Goto | |
| 3,921,403 A | 11/1975 | McInerney et al. | |
| 3,938,483 A | 2/1976 | Firey | |
| 3,963,006 A | 6/1976 | Firey | |
| 3,964,451 A | 6/1976 | Goto | |
| 3,977,195 A | 8/1976 | Treuil | |
| 3,986,351 A | 10/1976 | Woods et al. | |
| 3,995,606 A | 12/1976 | Firey | |
| 4,003,347 A | 1/1977 | Sasaki | |
| 4,009,574 A | 3/1977 | Melchior | |
| 4,009,694 A | 3/1977 | Firey | |
| 4,009,695 A | 3/1977 | Ule | |
| 4,020,809 A | 5/1977 | Kern et al. | |
| 4,022,167 A | 5/1977 | Kristiansen | |
| 4,033,304 A | 7/1977 | Luria | |
| 4,050,435 A | 9/1977 | Fuller, Jr. et al. | |
| 4,058,096 A | 11/1977 | Brown | |
| 4,075,986 A | 2/1978 | Keck | |
| 4,075,990 A | 2/1978 | Ribeton | |
| 4,084,557 A | 4/1978 | Luria | |
| 4,084,568 A | 4/1978 | Sato et al. | |
| 4,132,213 A | 1/1979 | Weaver | |
| 4,138,973 A | 2/1979 | Luria | |
| 4,149,493 A | 4/1979 | Franke | |
| 4,153,016 A | 5/1979 | Hausknecht | |
| 4,157,079 A | 6/1979 | Kristiansen | |
| 4,161,166 A | 7/1979 | Roznovsky | |
| 4,169,451 A | 10/1979 | Niggemeyer | |
| 4,174,683 A | 11/1979 | Vivian | |
| 4,180,035 A | 12/1979 | Saiki et al. | |
| 4,192,265 A | 3/1980 | Amano et al. | |
| 4,196,593 A | 4/1980 | Froeliger | |
| 4,206,728 A | 6/1980 | Trenne | |
| 4,215,659 A | 8/1980 | Lowther | |
| 4,231,225 A | 11/1980 | Aya | |
| 4,232,641 A * | 11/1980 | Curtil | 123/76 |
| 4,235,077 A | 11/1980 | Bryant | |
| RE30,565 E | 4/1981 | Kristiansen | |
| 4,261,307 A | 4/1981 | Oldberg | |
| 4,276,865 A | 7/1981 | Hamai | |
| 4,280,451 A * | 7/1981 | Moore | 123/90.6 |
| 4,282,933 A | 8/1981 | Suganami et al. | |
| 4,299,090 A | 11/1981 | Deutschmann | |
| 4,305,352 A | 12/1981 | Oshima et al. | |
| 4,315,488 A | 2/1982 | Tadokoro et al. | |
| 4,327,676 A | 5/1982 | McIntire et al. | |
| 4,344,289 A | 8/1982 | Curiel et al. | |
| 4,350,013 A | 9/1982 | Yoshiba | |
| 4,364,341 A | 12/1982 | Holtmann | |
| 4,387,672 A | 6/1983 | Crocker | |
| 4,400,945 A | 8/1983 | Deutschmann et al. | |
| 4,421,077 A | 12/1983 | Ruggeri | |
| 4,423,709 A | 1/1984 | Arrieta | |
| 4,424,790 A | 1/1984 | Curtil | |
| 4,426,848 A | 1/1984 | Stachowicz | |
| 4,426,985 A | 1/1984 | Kanesaka | |
| 4,438,737 A | 3/1984 | Burandt | |
| 4,446,821 A | 5/1984 | Cataldo | |
| 4,474,008 A | 10/1984 | Sakurai et al. | |
| 4,490,971 A | 1/1985 | Hedelin | |
| 4,494,506 A | 1/1985 | Hayama et al. | |
| 4,520,774 A | 6/1985 | Sitter | |
| 4,527,534 A | 7/1985 | Sakurai et al. | |
| 4,530,318 A | 7/1985 | Semple | |
| 4,539,946 A | 9/1985 | Hedelin | |
| 4,539,948 A | 9/1985 | Toepel | |
| 4,539,951 A | 9/1985 | Hara et al. | |
| 4,550,568 A | 11/1985 | Deutschmann et al. | |
| 4,552,112 A | 11/1985 | Nagao et al. | |
| 4,553,385 A | 11/1985 | Lamont | |
| 4,554,890 A | 11/1985 | Okimoto et al. | |
| 4,561,253 A | 12/1985 | Curtil | |
| 4,563,132 A | 1/1986 | Grimmer | |
| 4,565,167 A | 1/1986 | Bryant | |
| 4,566,422 A | 1/1986 | Tadokoro et al. | |
| 4,570,442 A | 2/1986 | Deutschmann et al. | |
| 4,572,114 A | 2/1986 | Sickler | |
| 4,576,127 A | 3/1986 | Doi et al. | |
| 4,582,029 A | 4/1986 | Masuda et al. | |
| 4,584,974 A | 4/1986 | Aoyama et al. | |
| 4,589,380 A | 5/1986 | Coad | |
| 4,592,310 A | 6/1986 | Hitomi et al. | |
| 4,592,319 A | 6/1986 | Meistrick | |
| 4,592,329 A | 6/1986 | Yunick | |
| 4,598,611 A | 7/1986 | Frank | |
| 4,608,951 A | 9/1986 | White | |
| 4,622,167 A | 11/1986 | Heath et al. | |
| 4,633,403 A | 12/1986 | Asmus | |
| 4,633,844 A | 1/1987 | Okimoto | |
| 4,643,049 A | 2/1987 | Nishikawa et al. | |
| 4,651,684 A | 3/1987 | Masuda et al. | |
| 4,667,636 A | 5/1987 | Oishi et al. | |
| 4,700,684 A | 10/1987 | Pischinger et al. | |
| 4,702,218 A | 10/1987 | Yoshioka et al. | |
| 4,714,063 A | 12/1987 | Oda et al. | |
| 4,716,863 A | 1/1988 | Pruzan | |
| 4,722,315 A | 2/1988 | Pickel | |
| 4,730,457 A | 3/1988 | Yamada et al. | |
| 4,738,110 A | 4/1988 | Tateno | |
| 4,753,198 A | 6/1988 | Heath | |
| 4,756,285 A | 7/1988 | Pischinger | |
| 4,759,188 A | 7/1988 | Schatz | |
| 4,770,060 A | 9/1988 | Elrod et al. | |
| 4,771,742 A | 9/1988 | Nelson et al. | |
| 4,777,916 A | 10/1988 | Holmer | |
| 4,798,184 A | 1/1989 | Palko | |
| 4,805,571 A | 2/1989 | Humphrey | |
| 4,815,423 A | 3/1989 | Holmér | |
| 4,833,971 A | 5/1989 | Kubik | |
| 4,836,161 A | 6/1989 | Abthoff et al. | |
| 4,841,936 A | 6/1989 | Takahashi | |
| 4,852,353 A | 8/1989 | Holmer | |
| 4,860,704 A | 8/1989 | Slaughter | |
| 4,862,841 A * | 9/1989 | Stevenson | 123/316 |
| 4,864,984 A | 9/1989 | Blish | |
| 4,876,988 A | 10/1989 | Paul et al. | |
| 4,878,464 A | 11/1989 | Richeson, Jr. et al. | |
| 4,885,911 A | 12/1989 | Woollenweber et al. | |

| | | | | | | |
|---|---|---|---|---|---|---|
| 4,903,488 A | 2/1990 | Shibata | 5,377,631 A | 1/1995 | Schechter | |
| 4,916,903 A | 4/1990 | Holmer | 5,379,743 A | 1/1995 | Stokes et al. | |
| 4,917,058 A | 4/1990 | Nelson et al. | 5,389,051 A | 2/1995 | Hirate et al. | |
| 4,928,648 A | 5/1990 | Schatz et al. | 5,390,492 A | 2/1995 | Levendis | |
| 4,930,315 A | 6/1990 | Kanesaka | 5,392,740 A | 2/1995 | Teramoto et al. | |
| 4,934,344 A | 6/1990 | Perr | 5,396,874 A | 3/1995 | Hitomi et al. | |
| 4,936,263 A | 6/1990 | Tamba et al. | 5,398,502 A | 3/1995 | Watanabe | |
| 4,945,870 A | 8/1990 | Richeson | 5,404,844 A | 4/1995 | Schechter | |
| 4,957,069 A | 9/1990 | Mederer | 5,408,979 A | 4/1995 | Backlund et al. | |
| 4,958,606 A | 9/1990 | Hitomi et al. | 5,417,186 A | 5/1995 | Elrod et al. | |
| 4,959,961 A | 10/1990 | Hiereth | 5,417,189 A | 5/1995 | Regueiro | |
| 4,961,406 A | 10/1990 | Burandt | 5,419,301 A | 5/1995 | Schechter | |
| 4,964,375 A | 10/1990 | Takeyama et al. | 5,421,296 A | 6/1995 | Hitomi et al. | |
| 4,982,567 A | 1/1991 | Hashimoto et al. | 5,421,308 A | 6/1995 | Hitomi et al. | |
| 5,000,145 A | 3/1991 | Quenneville | 5,425,239 A | 6/1995 | Gobert | |
| 5,002,022 A | 3/1991 | Perr | 5,426,936 A | 6/1995 | Levendis et al. | |
| 5,005,652 A | 4/1991 | Johnson | 5,427,078 A | 6/1995 | Hitomi et al. | |
| 5,012,778 A | 5/1991 | Pitzi | 5,429,100 A | 7/1995 | Goto et al. | |
| 5,020,327 A | 6/1991 | Tashima et al. | 5,433,180 A | 7/1995 | Hitomi et al. | |
| 5,033,268 A | 7/1991 | Hitomi et al. | 5,440,880 A | 8/1995 | Ceynow et al. | |
| 5,036,663 A | 8/1991 | Akagi et al. | 5,443,050 A | 8/1995 | Hitomi et al. | |
| 5,050,378 A | 9/1991 | Clemmens | 5,445,116 A | 8/1995 | Hara | |
| 5,054,439 A | 10/1991 | Akagi et al. | 5,445,128 A | 8/1995 | Letang et al. | |
| 5,076,248 A | 12/1991 | Schatz | 5,452,694 A | 9/1995 | Hara | |
| 5,083,543 A | 1/1992 | Harada et al. | 5,456,222 A | 10/1995 | Schechter | |
| 5,090,202 A | 2/1992 | Hitomi et al. | 5,456,224 A | 10/1995 | Riley | |
| 5,103,645 A | 4/1992 | Haring | 5,456,225 A | 10/1995 | Oikawa et al. | |
| 5,107,802 A | 4/1992 | Yagi et al. | 5,465,702 A | 11/1995 | Ferrenberg | |
| 5,117,790 A | 6/1992 | Clark et al. | 5,469,818 A | 11/1995 | Yoshioka et al. | |
| 5,119,795 A | 6/1992 | Goto et al. | 5,479,890 A | 1/1996 | Hu et al. | |
| 5,121,733 A | 6/1992 | Goto et al. | 5,488,970 A | 2/1996 | Cippitani | |
| 5,131,229 A | 7/1992 | Kriegler et al. | 5,492,103 A | 2/1996 | Goto | |
| 5,131,354 A | 7/1992 | Richeson | 5,493,798 A | 2/1996 | Rocke et al. | |
| 5,138,839 A | 8/1992 | Hitomi et al. | 5,494,008 A | 2/1996 | Ohkawa et al. | |
| 5,140,953 A | 8/1992 | Fogelberg | 5,494,009 A | 2/1996 | Yamada et al. | |
| 5,140,955 A | 8/1992 | Sono et al. | 5,495,830 A | 3/1996 | Wu | |
| 5,142,866 A | 9/1992 | Yanagihara et al. | 5,497,737 A | 3/1996 | Nakamura | |
| 5,161,497 A | 11/1992 | Simko et al. | 5,509,394 A | 4/1996 | Hitomi et al. | |
| 5,186,139 A | 2/1993 | Matsura | 5,518,818 A | 5/1996 | Kidai et al. | |
| 5,189,998 A | 3/1993 | Hara | 5,520,161 A | 5/1996 | Klopp | |
| 5,191,867 A | 3/1993 | Glassey | 5,531,193 A | 7/1996 | Nakamura | |
| 5,201,907 A | 4/1993 | Hitomi et al. | 5,535,704 A | 7/1996 | Paul | |
| 5,203,311 A | 4/1993 | Hitomi et al. | 5,535,716 A | 7/1996 | Sato et al. | |
| 5,205,251 A | 4/1993 | Conklin | 5,546,914 A | 8/1996 | Scheinert | |
| 5,205,265 A | 4/1993 | Kashiyama et al. | 5,549,080 A | 8/1996 | Uchikawa | |
| 5,215,061 A | 6/1993 | Ogawa et al. | 5,549,095 A * | 8/1996 | Goto et al. | 123/559.1 |
| 5,216,987 A | 6/1993 | Clarke | 5,553,573 A | 9/1996 | Hara et al. | |
| 5,230,320 A | 7/1993 | Hitomi et al. | 5,557,983 A | 9/1996 | Hara et al. | |
| 5,233,831 A | 8/1993 | Hitomi et al. | 5,558,060 A | 9/1996 | Horie et al. | |
| 5,233,948 A | 8/1993 | Boggs et al. | 5,560,207 A | 10/1996 | Ramsden et al. | |
| 5,235,940 A | 8/1993 | Nakatani | 5,564,275 A | 10/1996 | Codan et al. | |
| 5,239,960 A | 8/1993 | Sasaki et al. | 5,564,386 A | 10/1996 | Korte et al. | |
| 5,251,595 A | 10/1993 | Wei-Min | 5,586,526 A | 12/1996 | Lindquist | |
| 5,253,622 A | 10/1993 | Bornstein et al. | 5,586,527 A | 12/1996 | Kreuter | |
| 5,255,637 A | 10/1993 | Schechter | 5,586,531 A | 12/1996 | Vittorio | |
| 5,255,641 A | 10/1993 | Schechter | 5,588,411 A | 12/1996 | Kreuter et al. | |
| 5,255,654 A | 10/1993 | Karlsson | 5,590,632 A | 1/1997 | Kato et al. | |
| 5,271,359 A | 12/1993 | Teramoto et al. | 5,606,942 A | 3/1997 | Tsuzuku et al. | |
| 5,279,273 A | 1/1994 | Nakata et al. | 5,607,010 A | 3/1997 | Schonfeld et al. | |
| 5,293,741 A | 3/1994 | Kashiyama et al. | 5,611,202 A | 3/1997 | Sumser et al. | |
| 5,309,756 A | 5/1994 | Osawa et al. | 5,611,204 A | 3/1997 | Radovanovic et al. | |
| 5,327,856 A | 7/1994 | Schroeder et al. | 5,611,303 A | 3/1997 | Izuo | |
| 5,327,858 A | 7/1994 | Hausknecht | 5,615,554 A | 4/1997 | Gobert | |
| 5,333,456 A | 8/1994 | Bollinger | 5,615,646 A | 4/1997 | Feucht | |
| 5,335,633 A | 8/1994 | Thien | 5,617,726 A | 4/1997 | Sheridan | |
| 5,341,771 A | 8/1994 | Riley | 5,619,965 A | 4/1997 | Cosma et al. | |
| 5,357,936 A | 10/1994 | Hitomi et al. | 5,622,053 A | 4/1997 | Freen | |
| 5,363,816 A | 11/1994 | Yorita et al. | 5,622,144 A | 4/1997 | Nakamura et al. | |
| 5,365,895 A | 11/1994 | Riley | 5,623,896 A | 4/1997 | Kato et al. | |
| 5,365,896 A | 11/1994 | Hara et al. | 5,626,109 A | 5/1997 | Yasumura et al. | |
| 5,367,990 A | 11/1994 | Schechter | 5,632,255 A | 5/1997 | Ferrenberg | |

| Patent No. | Date | Inventor |
|---|---|---|
| 5,645,020 A | 7/1997 | Yamada |
| 5,645,030 A | 7/1997 | Letsche |
| 5,649,516 A | 7/1997 | Laveran |
| 5,657,630 A | 8/1997 | Kjemtrup et al. |
| 5,660,155 A | 8/1997 | Taue et al. |
| 5,661,835 A | 8/1997 | Kato et al. |
| 5,664,528 A | 9/1997 | Kato et al. |
| 5,664,529 A | 9/1997 | Kato et al. |
| 5,671,600 A | 9/1997 | Pischinger et al. |
| 5,678,515 A | 10/1997 | Kato et al. |
| 5,680,841 A | 10/1997 | Hu |
| 5,682,854 A | 11/1997 | Ozawa |
| 5,692,464 A | 12/1997 | Kimura |
| 5,704,316 A | 1/1998 | Fujimoto et al. |
| 5,711,154 A | 1/1998 | Baechle et al. |
| 5,713,317 A | 2/1998 | Yoshioka |
| 5,713,330 A | 2/1998 | Hitomi et al. |
| 5,713,331 A | 2/1998 | Eisenbacher et al. |
| 5,718,199 A | 2/1998 | Hu et al. |
| 5,724,927 A | 3/1998 | Suzuki |
| 5,724,939 A | 3/1998 | Faletti et al. |
| 5,732,554 A | 3/1998 | Sasaki et al. |
| 5,732,678 A | 3/1998 | Lindquist et al. |
| 5,762,480 A | 6/1998 | Adahan |
| 5,771,868 A | 6/1998 | Khair |
| 5,775,099 A | 7/1998 | Ito et al. |
| 5,775,283 A | 7/1998 | Sawai et al. |
| 5,778,674 A | 7/1998 | Kimura |
| 5,787,859 A | 8/1998 | Meistrick et al. |
| 5,791,146 A | 8/1998 | Dungner |
| 5,794,445 A | 8/1998 | Dungner |
| 5,806,308 A | 9/1998 | Khair et al. |
| 5,809,964 A | 9/1998 | Meistrick et al. |
| 5,813,231 A | 9/1998 | Faletti et al. |
| 5,816,216 A | 10/1998 | Egashira et al. |
| 5,819,702 A | 10/1998 | Mendler |
| 5,829,397 A | 11/1998 | Vorih et al. |
| 5,839,400 A | 11/1998 | Vattaneo et al. |
| 5,839,453 A | 11/1998 | Hu |
| 5,845,613 A | 12/1998 | Yoshikawa |
| 5,848,529 A | 12/1998 | Katoh et al. |
| 5,854,988 A | 12/1998 | Davidson et al. |
| 5,857,437 A | 1/1999 | Yoshioka |
| 5,862,790 A | 1/1999 | Dai et al. |
| 5,875,743 A | 3/1999 | Dickey |
| 5,924,395 A | 7/1999 | Moriya et al. |
| 5,927,075 A | 7/1999 | Khair |
| 5,937,807 A | 8/1999 | Peters et al. |
| 5,950,582 A | 9/1999 | Stein |
| 5,957,096 A | 9/1999 | Clarke et al. |
| 5,960,755 A | 10/1999 | Diggs et al. |
| 5,967,115 A | 10/1999 | Konopka et al. |
| 5,970,929 A | 10/1999 | Tacquet |
| 5,992,361 A | 11/1999 | Murata et al. |
| 5,992,390 A | 11/1999 | Moyer |
| 5,996,560 A | 12/1999 | Schechter |
| 6,000,374 A | 12/1999 | Cosma et al. |
| 6,003,316 A | 12/1999 | Baert et al. |
| 6,006,706 A | 12/1999 | Kanzaki |
| 6,012,424 A | 1/2000 | Meistrick |
| 6,020,651 A | 2/2000 | Nakamura et al. |
| 6,026,786 A | 2/2000 | Groff et al. |
| 6,035,639 A | 3/2000 | Kolmanovsky et al. |
| 6,035,640 A | 3/2000 | Kolmanovsky et al. |
| 6,041,602 A | 3/2000 | Dickey |
| 6,058,348 A | 5/2000 | Ohyama et al. |
| 6,067,800 A | 5/2000 | Kolmanovsky et al. |
| 6,067,946 A | 5/2000 | Bunker et al. |
| 6,076,353 A | 6/2000 | Freudenberg et al. |
| 6,079,378 A | 6/2000 | Taue et al. |
| 6,082,328 A | 7/2000 | Meistrick et al. |
| 6,085,705 A | 7/2000 | Vorih |
| 6,095,127 A | 8/2000 | Kolmanovsky et al. |
| 6,101,998 A | 8/2000 | Tamura et al. |
| 6,112,523 A | 9/2000 | Kamo |
| 6,128,902 A | 10/2000 | Kolmanovsky et al. |
| 6,135,073 A | 10/2000 | Feucht et al. |
| 6,148,778 A | 11/2000 | Sturman |
| 6,170,441 B1 | 1/2001 | Haldeman et al. |
| 6,178,749 B1 | 1/2001 | Kolmanovsky et al. |
| 6,189,504 B1 | 2/2001 | Israel et al. |
| 6,209,516 B1 | 4/2001 | Yamashita |
| 6,223,846 B1 | 5/2001 | Schechter |
| 6,234,123 B1 | 5/2001 | Iiyama et al. |
| 6,234,144 B1 | 5/2001 | Yamaguchi et al. |
| 6,237,551 B1 | 5/2001 | Macor et al. |
| 6,244,257 B1 | 6/2001 | Hu |
| 6,260,523 B1 | 7/2001 | Nakamura et al. |
| 6,266,957 B1 | 7/2001 | Nozawa et al. |
| 6,267,107 B1 | 7/2001 | Ward |
| 6,273,076 B1 | 8/2001 | Beck et al. |
| 6,276,316 B1 | 8/2001 | Arai et al. |
| 6,279,550 B1 | 8/2001 | Bryant |
| 6,286,482 B1 | 9/2001 | Flynn et al. |
| 6,295,816 B1 | 10/2001 | Gallagher et al. |
| 6,298,300 B1 | 10/2001 | Ohyama et al. |
| 6,301,887 B1 | 10/2001 | Gorel et al. |
| 6,301,889 B1 | 10/2001 | Gladden et al. |
| 6,302,076 B1 | 10/2001 | Bredy |
| 6,311,493 B1 | 11/2001 | Kurihara et al. |
| 6,332,447 B1 | 12/2001 | Kimura et al. |
| 6,338,244 B1 | 1/2002 | Guenther et al. |
| 6,338,245 B1 | 1/2002 | Shimoda et al. |
| 6,343,473 B1 | 2/2002 | Kanesaka |
| 6,354,254 B1 | 3/2002 | Usko |
| 6,394,051 B1 | 5/2002 | Filipe et al. |
| 6,405,694 B2 | 6/2002 | Sato |
| 6,439,195 B1 | 8/2002 | Warner |
| 6,460,337 B1 | 10/2002 | Olofsson |
| 6,467,452 B1 | 10/2002 | Duffy et al. |
| 6,474,323 B1 | 11/2002 | Beck et al. |
| 6,502,551 B2 | 1/2003 | Antonioli et al. |
| 6,513,319 B2 | 2/2003 | Nozawa et al. |
| 6,516,264 B2 | 2/2003 | Ohyama et al. |
| 6,571,765 B2 | 6/2003 | Kuboshima et al. |
| 6,575,129 B2 | 6/2003 | Almkvist et al. |
| 6,591,795 B2 | 7/2003 | Janak |
| 6,609,315 B1 | 8/2003 | Hendron et al. |
| 6,637,386 B2 | 10/2003 | Murata et al. |
| 6,640,754 B1 | 11/2003 | Iida |
| 6,651,618 B1 | 11/2003 | Coleman et al. |
| 6,662,552 B1 | 12/2003 | Gunther et al. |
| 6,679,207 B1 | 1/2004 | Leman |
| 6,722,349 B2 | 4/2004 | Leman et al. |
| 6,725,647 B2 | 4/2004 | Pfeifer et al. |
| 6,732,507 B1 | 5/2004 | Stanglmaier et al. |
| 6,732,685 B2 | 5/2004 | Leman |
| 6,739,125 B1 | 5/2004 | Mulligan |
| 6,925,976 B2 | 8/2005 | Israel et al. |
| 6,928,807 B2 | 8/2005 | Jacob et al. |
| 6,951,211 B2 | 10/2005 | Bryant |
| 6,955,144 B2 | 10/2005 | Sakai et al. |
| 7,004,122 B2 | 2/2006 | Cornell et al. |
| 7,007,650 B2 | 3/2006 | Harmon |
| 7,222,614 B2 | 5/2007 | Bryant et al. |
| 2001/0002379 A1 | 5/2001 | Schechter |
| 2001/0023671 A1 | 9/2001 | Vorih |
| 2002/0011233 A1 | 1/2002 | Shiraishi et al. |
| 2002/0026913 A1 | 3/2002 | Ariga |
| 2002/0062799 A1 | 5/2002 | Murata et al. |
| 2002/0117126 A1 | 8/2002 | Kaneko |
| 2002/0157623 A1 | 10/2002 | Turner et al. |

| | | | | | | |
|---|---|---|---|---|---|---|
| 2003/0106542 | A1 | 6/2003 | Aoyama et al. | EP | 0 291 792 A2 | 11/1988 |
| 2003/0145810 | A1 | 8/2003 | Leman et al. | EP | 0 344 780 A2 | 12/1989 |
| 2003/0164163 | A1 | 9/2003 | Lei et al. | EP | 0 440 314 A2 | 8/1991 |
| 2004/0020204 | A1 | 2/2004 | Callas et al. | EP | 0 269 125 B1 | 8/1992 |
| 2004/0118118 | A1 | 6/2004 | Weber et al. | EP | 0 560 476 A1 | 9/1993 |
| 2004/0206331 | A1 | 10/2004 | Leman | EP | 0 560 476 | 9/1993 |
| 2004/0237507 | A1 | 12/2004 | Duvinage et al. | EP | 0 568 214 | 11/1993 |
| 2005/0087159 | A1 | 4/2005 | Harmon | EP | 0 596 855 | 5/1994 |
| 2005/0098162 | A1 | 5/2005 | Bryant | EP | 0 596 860 A2 | 5/1994 |
| 2005/0183692 | A1 | 8/2005 | Weber et al. | EP | 0 646 703 A2 | 4/1995 |
| | | | | EP | 0 718 481 A2 | 6/1996 |
| | | | | EP | 0 761 950 | 3/1997 |

FOREIGN PATENT DOCUMENTS

| | | | | | |
|---|---|---|---|---|---|
| AU | A-15966/83 | 6/1983 | EP | 0 646 703 B1 | 12/1997 |
| DE | 286050 | 7/1915 | EP | 0 857 866 A1 | 8/1998 |
| DE | 1 001 049 | 1/1957 | EP | 0 690 214 B1 | 10/1999 |
| DE | 1 576 255 | 4/1970 | EP | 0 961 018 A1 | 12/1999 |
| DE | 2 125 368 | 12/1971 | EP | 1 022 446 A1 | 7/2000 |
| DE | 24 57 208 A1 | 6/1976 | EP | 1 116 870 A2 | 7/2001 |
| DE | 28 09 473 | 9/1978 | EP | 1 178 192 A2 | 2/2002 |
| DE | 27 34 715 A1 | 2/1979 | EP | 1 234 960 A2 | 8/2002 |
| DE | 78 03 641 U1 | 8/1979 | FR | 1066038 | 6/1954 |
| DE | 28 14 343 | 10/1979 | FR | 1 066 038 | 6/1954 |
| DE | 29 24 926 | 1/1980 | FR | 2 221 021 | 10/1974 |
| DE | 29 26 327 A1 | 1/1981 | FR | 2 242 884 | 3/1975 |
| DE | 29 30 124 | 2/1981 | FR | 2 269 282 | 11/1975 |
| DE | 29 30 124 A1 | 2/1981 | FR | 2 355 997 | 1/1978 |
| DE | 29 42 326 A1 | 4/1981 | FR | 2 393 937 | 1/1979 |
| DE | 30 06 619 A1 | 8/1981 | FR | 2 417 014 | 9/1979 |
| DE | 30 22 688 | 12/1981 | FR | 2 476 741 | 8/1981 |
| DE | 31 24 668 A1 | 1/1983 | FR | 2 485 622 | 12/1981 |
| DE | 32 28 680 | 2/1984 | FR | 2 583 108 A2 | 12/1986 |
| DE | 34 18 361 | 10/1984 | FR | 2 583 108 A2 | 12/1986 |
| DE | 33 47 567 | 7/1985 | FR | 2 674 285 A1 | 3/1991 |
| DE | 35 26 532 | 2/1986 | FR | 2 703 107 | 9/1994 |
| DE | 34 37 330 | 4/1986 | FR | 2 757 211 | 6/1998 |
| DE | 37 16947 C1 | 3/1988 | FR | 2 780 093 A3 | 12/1999 |
| DE | 37 25 448 | 2/1989 | GB | 1 303 080 | 1/1973 |
| DE | 37 30 001 A1 | 3/1989 | GB | 1 321 452 | 6/1973 |
| DE | 37 37 822 | 5/1989 | GB | 1 331 348 | 9/1973 |
| DE | 37 37 820 C2 | 8/1989 | GB | 1 437 171 | 5/1976 |
| DE | 37 37 823 | 8/1989 | GB | 1 467 969 | 3/1977 |
| DE | 39 03 474 A1 | 9/1989 | GB | 2018352 | 10/1979 |
| DE | 39 08 475 | 9/1989 | GB | 2 072 957 | 10/1981 |
| DE | 38 24 133 | 1/1990 | GB | 2 129 055 | 5/1984 |
| DE | 39 31 379 | 3/1990 | GB | 2 165 587 | 4/1986 |
| DE | 38 35 333 A1 | 4/1990 | GB | 2 180 298 | 3/1987 |
| DE | 40 04 806 | 8/1991 | GB | 2 202 001 | 9/1988 |
| DE | 40 07 516 | 9/1991 | GB | 2 253 881 | 9/1992 |
| DE | 41 15 008 A1 | 11/1992 | GB | 2 301 398 | 4/1996 |
| DE | 42 16 759 | 2/1993 | GB | 2 300 226 | 10/1996 |
| DE | 692 06 718 | 3/1993 | GB | 2 366 328 | 3/2002 |
| DE | 43 08 354 A1 | 9/1993 | GB | 2 366 330 | 3/2002 |
| DE | 43 12 085 | 10/1993 | GB | 2 366 331 | 3/2002 |
| DE | 43 12 205 | 10/1993 | GB | 2 367 147 | 3/2002 |
| DE | 43 32 604 | 3/1994 | GB | 2 367 148 | 3/2002 |
| DE | 44 16 670 | 2/1995 | GB | 2 368 614 | 5/2002 |
| DE | 195 11 320 | 10/1995 | JP | 51-13024 | 2/1976 |
| DE | 44 39 940 | 5/1996 | JP | 55-153820 | 12/1980 |
| DE | 44 40 289 A1 | 5/1996 | JP | 56-18030 | 2/1981 |
| DE | 44 43 169 A1 | 6/1996 | JP | 56-101022 | 8/1981 |
| DE | 195 14500 A1 | 10/1996 | JP | 56-101031 | 8/1981 |
| DE | 195 15 325 A1 | 10/1996 | JP | 58-30416 | 2/1983 |
| DE | 196 10 277 | 10/1996 | JP | 58-53634 | 3/1983 |
| DE | 195 17 590 | 11/1996 | JP | 58-53635 | 3/1983 |
| DE | 196 16 555 | 11/1996 | JP | 58-57019 | 4/1983 |
| DE | 196 48 337 A1 | 6/1998 | JP | 58-59317 | 4/1983 |
| DE | 19905636 | 3/2000 | JP | 58-62314 | 4/1983 |
| DE | 100 09 180 | 9/2001 | JP | 58-65932 | 4/1983 |
| DE | 101 59 801 | 4/2003 | JP | 58-117319 | 7/1983 |
| EP | 0 095 252 A2 | 11/1983 | JP | 58-119920 | 7/1983 |
| EP | 0 275 244 A1 | 7/1988 | JP | 58-122314 | 7/1983 |

| | | | | | | |
|---|---|---|---|---|---|---|
| JP | 58-122315 | 7/1983 | | JP | 05-215002 | 8/1993 |
| JP | 58-122318 | 7/1983 | | JP | 05-149118 | 9/1993 |
| JP | 58-131311 | 8/1983 | | JP | 05-340290 | 12/1993 |
| JP | 58-133422 | 8/1983 | | JP | 06-33775 | 2/1994 |
| JP | 58-133450 | 8/1983 | | JP | 06-74038 | 3/1994 |
| JP | 58-180722 | 10/1983 | | JP | 06-108860 | 4/1994 |
| JP | 58-187540 | 11/1983 | | JP | 06-108861 | 4/1994 |
| JP | 58-211526 | 12/1983 | | JP | 06-117280 | 4/1994 |
| JP | 59-7744 | 1/1984 | | JP | 6-119933 | 4/1994 |
| JP | 59-60034 | 4/1984 | | JP | 6-129271 | 5/1994 |
| JP | 59-99025 | 6/1984 | | JP | 06-200763 | 7/1994 |
| JP | 59-119007 | 7/1984 | | JP | 06-235305 | 8/1994 |
| JP | 59-158321 | 9/1984 | | JP | 06-235307 | 8/1994 |
| JP | 59-188031 | 10/1984 | | JP | 06-241097 | 8/1994 |
| JP | 59-211720 | 11/1984 | | JP | 06-346711 | 12/1994 |
| JP | 60-19916 | 2/1985 | | JP | 07-4287 | 1/1995 |
| JP | 60-90926 | 5/1985 | | JP | 07-26994 | 1/1995 |
| JP | 60-184918 | 9/1985 | | JP | 07-27022 | 1/1995 |
| JP | 61-70130 | 4/1986 | | JP | 07-34883 A | 2/1995 |
| JP | 61-89132 | 5/1986 | | JP | 07-54664 | 2/1995 |
| JP | 61-106918 | 5/1986 | | JP | 07-34883 B2 | 4/1995 |
| JP | 61-106919 | 5/1986 | | JP | 07-091265 | 4/1995 |
| JP | 61-106920 | 5/1986 | | JP | 7-145740 | 6/1995 |
| JP | 61-164036 | 7/1986 | | JP | 07-156692 | 6/1995 |
| JP | 61-182421 | 8/1986 | | JP | 07-156696 | 6/1995 |
| JP | 62-174513 | 7/1987 | | JP | 07-158473 | 6/1995 |
| JP | 62-288333 | 12/1987 | | JP | 07-166829 | 6/1995 |
| JP | 63-38620 | 2/1988 | | JP | 07-166926 | 6/1995 |
| JP | 63-55324 | 3/1988 | | JP | 07-180514 | 7/1995 |
| JP | 63-57822 | 3/1988 | | JP | 07-224626 | 8/1995 |
| JP | 63-51121 | 4/1988 | | JP | 07-224671 | 8/1995 |
| JP | 63-124828 | 5/1988 | | JP | 07-224678 | 8/1995 |
| JP | 63-176616 | 7/1988 | | JP | 7-233744 | 9/1995 |
| JP | 363176616 A | 7/1988 | | JP | 07-247859 | 9/1995 |
| JP | 63-198728 | 8/1988 | | JP | 07-259655 | 10/1995 |
| JP | 63-61717 B2 | 11/1988 | | JP | 07-269381 | 10/1995 |
| JP | 63-168221 | 11/1988 | | JP | 07-301107 | 11/1995 |
| JP | 63-268926 | 11/1988 | | JP | 07-310564 | 11/1995 |
| JP | 63-268927 | 11/1988 | | JP | 07-310603 | 11/1995 |
| JP | 63-268942 | 11/1988 | | JP | 07-324610 | 12/1995 |
| JP | 363268942 A | 11/1988 | | JP | 08-28280 | 1/1996 |
| JP | 64-315 | 1/1989 | | JP | 08-42381 | 2/1996 |
| JP | 10-24414 | 1/1989 | | JP | 08-61070 | 3/1996 |
| JP | 64-24118 | 1/1989 | | JP | 08-82218 | 3/1996 |
| JP | 64-83820 | 3/1989 | | JP | 08-100662 | 4/1996 |
| JP | 64-87828 | 3/1989 | | JP | 08-158901 | 6/1996 |
| JP | 64-87829 | 3/1989 | | JP | 08-158957 | 6/1996 |
| JP | 02-140421 | 5/1990 | | JP | 08-170551 | 7/1996 |
| JP | 03-37318 | 2/1991 | | JP | 08-177432 | 7/1996 |
| JP | 03-96624 | 4/1991 | | JP | 08-177433 | 7/1996 |
| JP | 03-138419 | 6/1991 | | JP | 08-177434 | 7/1996 |
| JP | 03-156123 | 7/1991 | | JP | 08-177435 | 7/1996 |
| JP | 04-31653 | 2/1992 | | JP | 08-177436 | 7/1996 |
| JP | 04031653 A | 2/1992 | | JP | 08-291715 | 11/1996 |
| JP | 04-103867 | 4/1992 | | JP | 08-326548 | 12/1996 |
| JP | 04-136467 | 5/1992 | | JP | 09-151737 | 6/1997 |
| JP | 04-287859 | 10/1992 | | JP | 02645942 B2 | 8/1997 |
| JP | 04-129812 | 11/1992 | | JP | 58-51221 | 3/1998 |
| JP | 05-1575 | 1/1993 | | JP | 10-141068 | 5/1998 |
| JP | 05-5430 | 1/1993 | | JP | 10-169513 | 6/1998 |
| JP | 05-71426 | 3/1993 | | JP | 10-238354 | 9/1998 |
| JP | 05-71428 | 3/1993 | | JP | 11-62639 | 3/1999 |
| JP | 05-86913 | 4/1993 | | JP | 11-315726 | 11/1999 |
| JP | 05-86989 | 4/1993 | | JP | 2000-120457 | 4/2000 |
| JP | 05-099007 | 4/1993 | | JP | 2000-145484 | 5/2000 |
| JP | 05106415 A2 | 4/1993 | | JP | 03-96624 B2 | 8/2000 |
| JP | 05-149136 | 6/1993 | | JP | 2000-220480 | 8/2000 |
| JP | 05-179966 | 7/1993 | | JP | 2001-193468 | 7/2001 |
| JP | 05-187279 | 7/1993 | | JP | 2002-256911 | 9/2002 |
| JP | 05-187329 | 7/1993 | | JP | 2003-262137 | 9/2003 |
| JP | 05-202810 | 8/1993 | | JP | 2003-269202 | 9/2003 |

| | | |
|---|---|---|
| SU | 248375 | 12/1969 |
| SU | 914788 | 3/1982 |
| SU | 1195026 A | 11/1985 |
| SU | 1195027 A | 11/1985 |
| SU | 1247573 A1 | 7/1986 |
| SU | 1668713 A1 | 8/1991 |
| SU | 1701953 A1 | 12/1991 |
| WO | WO 81/03200 | 11/1981 |
| WO | WO 83-04280 | 12/1983 |
| WO | WO 90-10141 | 9/1990 |
| WO | WO 90/15917 | 12/1990 |
| WO | WO 91-05152 | 4/1991 |
| WO | WO 92-04536 | 3/1992 |
| WO | WO 92/13178 | 8/1992 |
| WO | WO 94-28288 A2 | 12/1994 |
| WO | WO 94-28288 A3 | 12/1994 |
| WO | WO 95/08705 | 3/1995 |
| WO | WO 95-15429 | 6/1995 |
| WO | WO 95-16106 | 6/1995 |
| WO | WO 95/18294 | 7/1995 |
| WO | WO 95-23280 | 8/1995 |
| WO | WO 95-24549 | 9/1995 |
| WO | WO 95/33131 | 12/1995 |
| WO | WO 96/01939 | 1/1996 |
| WO | WO 96/15362 | 5/1996 |
| WO | WO 96-30635 | 10/1996 |
| WO | WO 97-11260 | 3/1997 |
| WO | WO 98/02653 | 1/1998 |
| WO | WO 98-07973 | 2/1998 |
| WO | WO 98-34014 | 8/1998 |
| WO | WO 98-55744 | 12/1998 |
| WO | WO 99/42718 | 8/1999 |
| WO | WO 00-23698 | 4/2000 |
| WO | WO 00-28197 | 5/2000 |
| WO | WO 00-68565 A1 | 11/2000 |
| WO | WO 01/20150 | 3/2001 |
| WO | WO 01/46574 A2 | 6/2001 |
| WO | WO 01-69062 A1 | 9/2001 |
| WO | WO 01/86125 A1 | 11/2001 |
| WO | WO 2004/081356 | 9/2004 |

OTHER PUBLICATIONS

Heywood, *Internal Combustion Engine Fundamentals,* International Edition, McGraw–Hill Book Co. (1988), 21 pages (including pp. 1, 7–11, 22, 162–164, 183–186, 248–250, 462, and 463).

Okamoto et al., *Study on Miller Cycle Gas Engine for Co-generation Systems—Effect of Miller Cycle on the Performance of Gas Engine,* SAE Paper No. 960949, Feb. 26–29, 1996, 15 pages (including pp. 125–137).

English language translation of JP 04–136467.

Zappa et al., CIMAC, "A 4–Stroke High Speed Diesel Engine with Two–Stage of Supercharging and Variable Compression Ratio," 13th International Congress on Combustion Engines, Vienna, 1979 (23 pages).

Obert, "Internal Combustion Engines, 2nd Edition, *Analysis and Practice*" (pp. 142–144, 153 and 154; Fig. 5–12) (1950).

Thring, R., "The Flexible Diesel Engine," SAE Technical Paper Series 900175, Feb. 26–Mar. 2, 1990, p. 31, col. 1, 1st para.; col. 1, 2nd para., lns. 1–4; p. 31, col. 2, 2nd para., lns. 9–11; col. 2, last para., lns. 1–2; p. 31, col. 2, Table 1; p. 36, col. 1, last paragraph, lns. 1–2 (pp. 31–39).

Further Translation of JP 07–091265, listed above; pp. 9–10, para. 15; pp. 11–12, para. 20; p. 13, para. 24 (30 pages).

Miller, R. and Lieberherr, H., "The Miller Supercharging System for Diesel and Gas Engines Operating Characteristics", International Congress of Combustion Engine Conference, CIMAC, 1957, pp. 787–803.

Miller, R., "Supercharging and Internal Cooling Cycle for High Output", Oil and Gas Power Division proceedings of the National Conference, 1946, ASME 46–OGP–4, pp. 1–5.

Morel, T. et al., "Application of Several Variable Valve Timing Concepts to an LHR Engine", Journal of Engineering for Gas Turbines and Power, 1987, pp. 402–409, vol. 109, ASME 87–ICE–29.

Assanis, D. and Bolton, B., "Variable Valve Timing Strategies for Optimum Engine Performance and Fuel Economy", Jan. 23–27, 1994, ASME 94–ICE–5, pp. 1–11.

Zappa, G. and Franca, T., "A 4–Stroke High Speed Diesel Engine with Two–Stage of Supercharging and Variable Compression Ratio", 13th International Congress on Combustion Engines, 1979, pp. D19–1–D19–22.

Dresner, T. and Barkan, P., "A Review of Variable Valve Timing Benefits and Modes of Operation", SAE Technical Paper Series 891676, 1989, pp. 1–9.

Ahmad, T. and Theobold, M., "A Survey of Variable–Valve–Actuation Technology", SAE Technical Paper Series 891674, Aug. 7–10, 1989, pp. 1–27.

MA, T., "Effect of Variable Engine Valve Timing on Fuel Economy", SAE Technical Paper Series 880390, Feb. 29–Mar. 4, 1988, pp. 1–8.

MA, T. and Rajabu, H., "Computer Simulation of an Otto–Atkinson Cycle Engine with Variable Timing Multi–Intake Valves and Variable Compression Ratio", IMechE C53/88, 1988, pp. 273–277.

Porter, B. et al., "Control Technology for Future Low Emissions Diesel Passenger Cars", C517/035/96, 12 pages.

Charlton, S. et al., "Application of Variable Valve Timing To a Highly Turbo Charged Diesel Engine", C405/044/IMechE, 1990, pp. 189–195.

Ladommatos, N. and Stone, C., "Developments for Direct Injection Diesel Engines", Mechanical Engineering Publications Limited, 1986, pp. 41–53.

Roe, G., "Variable Valve–Time Unit Suitable for Internal Combustion Engines", vol. 186 23/72, pp. 301–306 and D103–D105.

Payri, F. et al., "Reduction of Pumping Losses By the Use of a Variable Valve Timing System", IMechE 105/84, 1984, pp. 295–300.

Charlton, S., "A Continuously Variable Poppet Valve Actuator for Internal Combustion Engines", IMechE 82/86, 1986, pp. 157–195.

Thring, R., "The Flexible Diesel Engine", SAE Technical Paper Series 900175, Feb. 26–Mar. 2, 1990, pp. 31–39.

Mavinahally, N. et al., "Insulated Miller Cycle Diesel Engine", SAE Technical Paper Series 961050, Feb. 26–29, 1996, pp. 1–9.

Schechter, M. and Levin, M., "Camless Engine", SAE Technical Paper Series 960581, Feb. 25–29, 1996, pp. 17–31.

Miller, R., "Supercharging and Internal Cooling Cycle for High Output", ASME, 1947, pp. 453–464, vol. 69.

Mardell, J. and Cross, R., "An Integrated, Full Authority, Electrohydraulic Engine Valve and Diesel Fuel Injection System", SAE Technical Paper Series 880602, Feb. 29–Mar. 4, 1988, pp. 1–10.

Gray, C., "A Review of Variable Engine Valve Timing", SAE Technical Series 880386, Feb. 29–Mar. 4, 1988, pp. 1–11.

Asmus, T., "Perspectives on Applications of Variable Valve Timing", SAE Technical Series 910445, Feb. 25–Mar. 1, 1991, pp. 1–13.

Vormstein, W. and Pleimling, H., "Valve Timing and its Effect on the Performance of Medium–Speed Diesel Engines", 12$^{th}$ International Congress on Combustion Engines, 1977, pp. 1–41.

Chute, R., "Pressure Compounding a Four Cycle Diesel Engine", SAE Technical Paper Series 851520, Sep. 9–12, 1985, pp. 1–15.

Ishizuki, et al., "A New Type of Miller Supercharging System for High Speed Engines Part 2–Realization of High BMEP Diesel Engines", SAE Technical Series 851523, Sep. 9–12, 1985, pp. 1–10.

Leonard, H. et al., "Parametric Investigation of Variable Valve Timing Applied to a Turbocharged Diesel Engine", SAE Technical Paper Series 910453, Feb. 25–Mar. 1, 1991, pp. 1–9.

Leonard, H. et al., "Design and Analysis of a Roller Follower Variable Valve Timing System", SAE Technical Paper Series 930824, Mar. 1–5, 1993, pp. 61–70.

Tuttle, J., "Controlling Engine Load by Means of Late Intake–Valve Closing", SAE Technical Paper Series 800794, Jun. 9–13, 1980, pp. 1–13.

Bata, R. et al., "Variable Valve Timing for Diesel Compression Ratio Control", American Society of Mechanical Engineers, Internal Combustion Engine Division ICE, vol. 13, New Technology in Large Bore Engines, 1990, pp. 89–93.

Meier, E., and Baden, "The Miller System–a Possible Solution to Present Problems with Highly Charged Four–Stroke Engines", Brown Boveri Review, Apr. 1977, pp. 235–242, vol. 64, No. 4.

Bolton, B. and Assanis, D., "Optimum Breathing Strategies for Turbocharged Diesel Engines Based on the Miller Cycle Concept", American Society of Mechanical Engineers, Petroleum Division, Engineering Systems Design and Analysis, ASME, 1994, pp. 253–262, vol. 8: Part B.

"Internal–Combustion Engines," The New Encyclopaedia Britannica, 1987, pp. 474–485, Fifteenth edition, Chicago, IL.

Drei, V., "B230 Engines: Research and Experiments for Widening the Speed and Output Range and for Utilizing Alternative Fuels", Tech Paper 41336, 1983, pp. 703–728.

"Camlobe Phasing May Be the Key to Controlling Emissions", Automotive Engineer, Jun./Jul. 1990, pp. 26–27.

Berchtold, M., "Two Stage Supercharging with Comprex", 14$^{th}$ International Congress on Combustion Engines, 1981, pp. D111–1–D111–15.

Frankle, G., "Potential for Reducing Internal Engine Emissions in Modern Commercial Vehicle Diesel Engines", ACEA, Jul. 1–2, 1996, 28 pages.

Sakai, H. et al., "A New Type of Miller Cycle Diesel Engine", JSAE Review, Apr. 1988, pp. 4–9.

Chosi, M. et al., "Development of V6 Miller Cycle Engine", JSAE Review 15 9434154, 1994, pp. 195–200.

Nagao, F. et al., "Relation between Inlet Valve Closing Angle and Volumetric Efficiency of a Four–Stroke Engine", Bulletin of JSME 621.43.05, 1969, pp. 894–901.

Ma, T., "Recent Advances in Variable Valve Timing", pp. 235–252.

Hara, S. et al., "Effects of Intake–Valve Closing Timing on Spark–Ignition Engine Combustion", SAE Technical Paper Series 850074, Feb. 25–Mar. 1, 1985, pp. 1–10.

Stone, R. and Kwan, E., "Variable Valve Actuation Mechanisms and the Potential for their Application", SAE Technical Paper Series 890673, Feb. 27–Mar. 3, 1989, pp. 1–18.

Meacham, G., "Variable Cam Timing as an Emission Control Tool", ASE 700673, Aug. 24–27, 1970, pp. 1–16.

Siewert, R., "How Individual Valve Timing Events Affect Exhaust Emissions", ASE 710609, Jun. 7–11, 1971, pp. 1–17.

Freeman, M. and Nicholson, R., "Valve Timing for Control of Oxides of Nitrogen (NO)", ASE 720121, Jan. 10–14, 1972, pp. 1–10.

Schiele, C., "Design and Development of a Variable Valve Timing (VVT) Camshaft", ASE 740102, Feb. 25–Mar. 1, 1974, pp. 1–9.

Bates, B. et al., "Variable Displacement by Engine Valve Control", ASE Technical Paper Series 780145, Feb. 27–Mar. 3, 1978, pp. 1–12.

Siegla, D. and Siewert, R., "The Variable Stroke Engine—Problems and Promises", ASE Technical Paper Series 780700, Aug. 7–10, 1978, pp. 1–12.

Luria, D. et al., "The Otto–Atkinson Engine—A New Concept in Automotive Economy", SAE Technical Paper Series, 820352, Feb. 22–26, 1982, pp. 1–8.

Tuttle, J., "Controlling Engine Load by Means of Early Intake Valve Closing", SAE Technical Paper Series 820408, Feb. 22–26, 1982, pp. 1–17.

Asmus, T., "Valve Events and Engine Operation", SAE Technical Paper Series 820749, Jun. 7–10, 1982, pp. 1–14.

Herrin, R. and Pozniak D., "A Lost–Motion, Variable–Valve–Timing System for Automotive Piston Engines", SAE Technical Paper Series 840335, Feb. 27–Mar. 2, 1984, pp. 1–15.

Richman, R. and Reynolds, W., "A Computer–Controlled Poppet–Valve Actuation System for Application on Research Engines", SAE Technical Paper Series 840340, Feb. 27–Mar. 2, 1984, pp. 1–9.

Elrod, A., and Nelson, M., "Development of a Variable Valve Timed Engine to Eliminate the Pumping Losses Associated with Throttled Operation", SAE Technical Paper Series 860537, Feb. 24–28, 1986, pp. 1–8.

Nelson, M. and Elrod, A., "Continuous–Camlobe Phasing: An Advanced Valve–Timing Approach", SAE Technical Paper Series 870612, Feb. 23–27, 1987, pp. 1–10.

Freudenstein, F. et al., "The Synthesis and Analysis of Variable–Valve–Timing Mechanisms for Internal–Combustion Engines", SAE Technical Paper Series 880387, Feb. 29–Mar. 4, 1988, pp. 1–10.

Lenz, H. et al., "Variable Valve Timing–A Possibility to Control Engine Load without Throttle", SAE Technical Paper Series 880388, Feb. 29–Mar. 4, 1988, pp. 1–7.

Sapienza, S. et al., "An Electronically Controlled Cam Phasing System", SAE Technical Paper Series 880391, Feb. 29–Mar. 4, 1988, pp. 1–7.

Griffiths, P. and Mistry, K, "Variable Valve Timing for Fuel Economy Improvement—The Mitchell System", SAE Technical Paper Series 880392, Feb. 29–Mar. 4, 1988, pp. 1–9.

Entzminger, W., "Variable Valve Action (VVA) Through Variable Ratio Rocker Arms", SAE Technical Paper Series 880730, Feb. 29–Mar. 4, 1988, pp. 1–11.

Dresner, T. and Barkan, P., "A Review and Classification of Variable Valve Timing Mechanisms", SAE Technical Paper Series 890674, Feb. 27–Mar. 3, 1989, pp. 1–14.

Saunders, R. and Abdul–Wahab, E., "Variable Valve Closure Timing for Load Control and the Otto Atkinson Cycle Engine", SAE Technical Paper Series 890677, Feb. 27–Mar. 3, 1989, pp. 1–11.

Lenz, H. et al., "Initial Test Results of an Electro–Hydraulic Variable–Valve Actuation System on a Firing Engine", SAE Technical Paper Series 890678, Feb. 27–Mar. 3, 1989, pp. 1–8.

Grohn, M., "The New Camshaft Adjustment System by Mercedes–Benz–Design and Application in 4–Valve Engines", SAE Technical Paper Series 901727, Feb. 17–20, 1990, pp. 1–6.

Gould, L. et al., "Performance Evaluation of a Camless Engine Using Valve Actuators with Programmable Timing", SAE Technical Paper Series 910450, Feb. 25–Mar. 1, 1991, pp. 1–13.

Nagesh, M. et al., "Experimental Investigation on Extended Expansion Engine (EEE)", SAE Technical Paper Series 920452, Feb. 24–28, 1992, pp. 1–14.

Wilson, N. et al., "Asymmetric Valve Strategies and Their Effect on Combustion", SAE Technical Paper Series 930821, Mar. 1–5, 1993, pp. 29–40.

Hatano, K. et al., "Development of a New Multi–Mode Variable Valve Timing Engine", SAE Technical Paper Series 930878, Mar. 1–5, 1993, pp. 137–143.

Saunders, R. and Rabia, S., "Part Load Efficiency in Gasoline Engines", 1986, pp. 55–62, Mechanical Engineering Publications Limited, Suffolk, UK.

Stone, C. and Kwan, E., "Variable Valve Timing for IC Engines", Automotive Engineer, pp. 54–58.

Dresner, T., "Multi–input CAM–Actuated Mechanisms and their Application to IC Engine Variable Valve Timing", A Dissertation Submitted to the Department of Mechanical Engieneering and the Committee of Graduate Studies of Stanford University, Sep. 1988, No. 8906655, pp. 1–277.

English Language JPO Abstract of JP Publication No. 2000145484 A, May 26, 2000.

English Language JPO Abstract of JP Publication No. 2000120457 A, Apr. 25, 2000.

Communication from European Patent Office dated May 18, 2005 from EP Patent Application No. 03006344.0–2311 including Partial Search Report, Lack of Unity Opinion, and Annex to Search Report.

Request for Ex Parte Reexamination for U.S. Patent No. 6,688,280 filed Jan. 18, 2006, including Delaration of Dr. Joel Hiltner with each Exhibit referred to in the Declaration.

Sakai, H. et al., "A Miller System Application for Efficient Diesel Power Units," The American Chemical Society, 1986, pp. 355–360.

Dickey et al., "Nox Control in Heavy–Duty Diesel Engines—What is the Limit?", SAE 980174, International Congress and Exposition, Detroit, Michigan, Feb. 23–26, 1998, (16 pages).

"Jacobs Vehicle Systems, Future Technology: VVA, VVA—Variable Actuation Systems," http://www.jakebrake.com/content.php4?doc_uid=11, pp. 1–2.

Richard Car's, "Paxman History Pages, Paxman Diesel Engines Since 1934," http://www.nelmesfsnet.co.uk/paxman/paxeng34.htm, pp. 1 & 9.

"ALSTOM Engines, Paxman VP185," pp. 1–3, and 6.

Dipl.–Ing. Jörg Ballauf, "The 8$^{th}$ Annual Automobile and Engine Technology Coolquium in Aachen An Overview," pp. 1–5.

"Stuman Industries, Leading The Mechanical World Into The Digital Age, Hydraulic Valve Actuation," http://www.sturmanindustries.com/main/hydraulicValveActuation.htm, pp. 1–2.

"Eaton Automotive—Engine Products, Variable Valve Actuation Devices," http://www.automotive.eaton.com/product/engine_controls/VVA.html, p. 1.

Lilly, L., "Diesel Engine Reference Book," 1984, Chapter 2, p. 3; Chapter 3, pp. 7–8.

Tennison, P., "An Experimental Investigation of the Effects of Common Rail Injection Parameters on Emissions and Performance in a High Speed Direct Injection Small Bore Diesel Engine," pp. 1–2.

Delphi, "Notas de prensa, Delphi Launches World's Most Advanced Common Rail Diesel System With Ford," Aug. 21, 2004, http://www.delphidieselsystems.com/diesel/es/ESDDSNewsitems4321.asp, pp. 1–3.

Isuzu, Press Release, "Isuzu New Direct Injection Diesel Lineup," Oct. 19, 1999, http://www.isuzu.co.jp/world/press/1999/p_1019_2.html, pp. 1–2.

Hara et al., "Effects of Intake–Valve Closing Timing on Spark–Ignition Engine Combustion", SAE Technical Paper Series 850074, Feb. 25–Mar. 1, 1985, pp. 1–10.

Communication/European Search Report dated Apr. 21, 2005 from EP Patent Application No. 04029382.1 of Clyde C. Bryant.

Okamoto, Kazuhisa et al., "Development of a High–Performance Gas Engine Operating at a Stoichiometric Condition–Effect of Miller Cycle and EGR", CIMAC Congress 1998, pp. 1345–1360.

Okamoto, Kazuhisa et al., "Effect of EGR on The Late Intake–Valve Closing Miller Cycle for Natural Gas Engines", JSAE 983420 vol. 29, No. 2, Apr. 1998, pp. 17–22.

Roda, Franco, "Variable Valve Timing—A Means of Optimizing Turbocharged Four–Stroke Diesel Engines", MTZ "Motortechnische Zeitschrift" (Engine Technology Magazine) 49, 1988, pp. 303–308.

Akiyama, Mamoru et al., "An Elegant Solution for Vehicular Diesel's Emission and Economy—Hybrid EGR System", SAE 960842, pp. 1–5.

Okamoto, Kazuhisa et al., "Development of a Late Intake–Valve Closing (LIVC) Miller Cycle for Stationary Natural Gas Engines—Effect of EGR Utilization", SAE 972948, 1997, pp. 87–89.

Zhang, Fu–Rong et al., "Methods of Increasing the BMEP (Power Output) for Natural Gas Spark Ignition Engines", SAE 981385, May 4–6, 1998, pp. 11–19.

Zhang, Fu–Rong et al., "Improvement of BMEP for Natural Gas Spark Ignition Engines by Using Miller Cycle and EGR", JSAE 9834196 vol. 29, No. 2, Apr. 1998, pp. 11–16.

Nagumo, Shinichi et al., "Study of Fuel Economy Improvement through Control of Intake Valve Closing Timing: Cause of Combustion Deterioration and Improvement", JSAE 9439311, JSAE Review 16 (1995), pp. 13–19.

"Optimierung von Arbeits—und Brennverfahren fur grobere Dieselmotoren mit Common–Rail–Einspritzung", MTZ Motortechnische Zeitschrift 61(2000) 4, pp. 248–257.

Clarke, Damien et al., "The Stimulation, Implementation and Analysis of the Miller Cycle Using an Inlet Control Rotary Valve", SAE Technical Paper Series 970336, Feb. 24–27, 1997, pp. 61–70.

Sakai, Hiroshi et al., "A New Type of Miller Supercharging System for High–Speed Engines—Part 1 Fundamental Considerations and Application to Gasoline Engines", SAE 851522, Sep. 9–12, 1985, pp. 1–7.

Narusawa, Kazuyuki, "An EGR Control Method for Heavy–Duty Diesel Engines under Transient Operations", SAE Technical Paper Series 900444, Feb. 26–Mar. 2, 1990, pp. 1–14.

Gould, Larrie et al., "Electronic Valve Timing: The Impact of electronic valve timing on engine 'breathing' produces performance capability radically different from any traditional internal combustion engine", SAE Automotive Engineering vol. 99, No. 4, Apr. 1991, pp. 19–24.

Taylor, Charles Fayette, "The Internal–Combustion Engine in Theory and Practice: vol. 1: Thermodynamics, Fluid, Flow, Performance", Second Edition, Revised, 1985, pp. 8, 362, 392–394, 456–458, 489–491.

Taylor, Charles Fayette, "The Internal–Combustion Engine in Theory and Practice: vol. 2: Combustion, Fuels, Materials, Design", Revised Edition, 1985, pp. 7, 29–31, 71–72, 104, 117, 233–234, 367, 402–409, 422.

Wadman, Bruce W., "Tandem Turbocharging Delivers 250 BMEP Rating", Diesel and Gas Turbine Progress, Jul. 1967, vol. 23, No. 7, pp. 50–51.

Wadman, Bruce W., "Nordberg Centrifugal Gas Compressor Unit", Diesel and Gas Engine Progress, Apr. 1995, pp. 24–26.

Ansdale, R.F., "The Varimax Engine", Automobile Engineer, Sep. 1968, pp. 382–387.

Miller, R., "Nordberg Supairthermal Diesel, Duafuel and Gas Engines Operating on the Miller Supercharging System", Petroleum Division Conference, ASME, Sep. 1951.

Brinson, L., "High Performance Gas Burning Engines", Seventh International Congress on Combustion Engines, CIMAC, Apr. 1965. pp. 603–622.

Azouz, M.R. et al., "Digital Control Engine Valve Timing", Military Technical College, Egypt, Isata, 1987, pp. 193; 195–205.

D'Yachenko, V.G., "Internal Combustion Engines Operation Theory", Kiev, 1988.

"Valve Timing by Tensioner", Engineering Magazine, May 1986, pp. 343, 359.

Hutten, H., "Schnelle Motoren seziert und frisiert", Motorbuchverlag ISBN 3–87943–974–5, 1994, 2 pages.

Heywood, J., "Internal Combustion Engine Fundamentals", McGraw Hill International Editions, Automotive Technology Series, 1989, pp. 6–10.

Hilliard, J., and Springer, George S., "Fuel Economy in Road Vehicles Powered by Spark Ignition Engines", 1988, pp. 182–187.

"Internal Combustion Engines", Moscow, 1990, pp. 12–23.

Khutziev, A.I., "Internal Combustion Engines with Controlled Compression Mode", Moscow, 1986, pp. 64–69, 102–103.

Lenin, I.M., "Theory of Automotive and Tractor Engines", Moscow, 1969, pp. 34–41, 62–65, 364–367.

Miller, R., "A Low Temperature Supercharging System for Compression, Pilot Oil and Spark Ignition Engines", ASME, paper No. 57–A–250, 1957, pp. 1–10.

"High Powered Medium Speed Engines", The Motor Ship, Jul. 1975, pp. 135–173.

"Two–stage Turbocharging for GMT's B230 High Speed Engine", The Motor Ship. Sep. 1978, pp. 27–32, 67–68.

O'Flynn, G. et al., "Combustion Characteristics of an Otto–Atkinson Engine Using Late Inlet Valve Closing and Multi–Point Electronic Fuel Injection", C389/041 IMechE, Paper No. 925107, 1992, pp. 329–338.

Petrov, A.K. et al., "Structural Design of Foreign Cars Produced at 1983", Annual Review, Part III, Automotive Engines, Moscow, 1983, pp. 3–19.

Rajikov, I. et al., "Automotive and Tractor Engines Structural Design", Moscow, 1986. pp. 18–27, 104–107.

Rannev, A. V., "Internal Combustion Engines for Construction Site and Road–Building Engines", Moscow, 1986, pp. 10–17.

Boggs, D.L. et al., "The Otto–Atkinson Cycle Engine–Fuel Economy and Emission Results and Hardware Design", SAE Technical Paper Series 950089, Feb. 27–Mar. 2, 1995, pp. 1–13.

Scott, D., "Variable Valve Timing Has Electronic Control", SAE Automotive Engineering, May 1984, pp. 86–87.

Kentfield, J., "Diesel Engines with Extended Expansion Strokes", SAE Technical Paper Series 891866, Sep. 11–14, 1989, pp. 1–10.

Herzog, P. et al., "NOx Reduction Strategies for DI Diesel Engines", SAE Technical Paper Series 920470, Feb. 24–28, 1992, pp. 1–17.

Durnholz, M. et al., "Exhaust–Gas Recirculation—A Measure to Reduce Exhaust Emissions of DI Diesel Engines", SAE Paper Technical Series 920725, Feb. 24–28, 1992.

Stebler, H. et al., "Reduction of NOx Emissions of D.I. Diesel Engines by Application of the Miller–System: An Experimental and Numerical Investigation", SAE Technical Paper Series 960844, Feb. 26–29, 1996, pp. 1–11.

Kamo, R. et al., "Emissions Comparisons of an Insulated Turbocharged Multi–Cylinder Miller Cycle Diesel Engine", SAE Technical Paper Series 980888, Feb. 23–26, 1998, pp. 1–7.

Sapojhnikov, E.N., "International Combustion Engines", Kiev, 1979, pp. 8–17.

Torazza, G., "A Variable Lift and Event Control Device for Piston Engine Valve Operation", pp. 59–69, Italy.

Wallace, W., and Lux, F., "A Variable Compression Ratio Engine Development", SAE Transactions, Paper No. 762A, Oct. 1963, pp. 680–707.

"Volvo D6A250 Supercharger—Med Hog Prestanda Redan Fran Start", Volvo, 1996.

Vzorov, B.A., and Mordukhovich, M.M., "Forcing of Tractor Engines", Moscow, 1974, pp. 24–31.

Stojek, D., and Stwiorok, A., "Valve Timing with Variable Overlap Control", XX Fisita Congress, SAE 845026, May 1984, pp. 2.8–2.14.

Nagumo, S., et al., "Study of Fuel Economy Improvement Through Control of Intake Valve Closing Timing", 1994, pp. 169–172.

Zhang, F. et al., "Study on Miller Cycle Gas Engine for Generation—A Verification of Miller Cycle Effect", JSAE Convention, May 1995, vol. 1995, vol. 951, No. 5, pp. 277–280, Paper No. 9534621.

Nakajima, Y., et al., "Study of Improving Fuel Economy by Early Intake–Valve–Closing Concept", No. 24, 1982, pp. 19–26.

Sakono, T., et al., "Mazda 2.5/ Inline 4W–T Type Turbo Diesel Engine", Mazda Motor Corporation, Dec. 1995, vol. 34, No. 435, pp. 93–99.

Sasaki, Y., "Komatsu Turbo and Turbo Diesel Engine Two Stage Turbocharging for Small Highspeed Diesel Engine", Komatsu Ltd., Dec. 1984, vol. 23 No. 301, pp. 19–24.

Kouichi, H. et al., "Development of Miller Cycle Gasoline Engine—Miller Cycle Engine with Late Intake Valve Closing and Lysholm Compressor", May 1993, Paper No. 9302088, pp. 201–204.

Ichimaru, K., et al., "A High Expansion Ration Gasoline Engine with Intake Control Rotary Valve Isntallation", Oct. 1992, Paper No. 924008, pp. 29–32.

Koichi, H., et al., "KJ–ZEM Type Miller Cycle DOHC/2254 cc", Ser. No. 0005, pp. 118–163.

Suzuki, T., et al., "Application of a Miller System to a Diesel Engine", Nov. 1991, Paper No. 912183, pp. 2.13–2.16.

Zhang, F., et al., "Effect of Miller Cycle on Gas Engine for Generation", JSAE Spring Convention, Jan. 1996, vol. 27, No. 1, Paper No. 9630723, pp. 79–83.

Ichimaru, K., et al., "Computer Simulation of Miller Cycle Gasoline Engines", JSAE Spring Convention, May 1995, vol. 951, No. 5, Paper No. 9534612, pp. 273–276.

Heuser, F., "Von der Fakultat fur Maschinenwesen der Rheinisch–Westfallschen Technischen Hochschule Aachen genehmigte Dissertation zur Eriangung des akademischen Grades eines", A Disseratation Submitted to the , Jul. 8, 1988, pp. 1–99.

Haas, A., et al., "Mesures Pour Reduire Les Emissions NOx Des Moteurs Pour Vehicules Utilitaires" Le Moteur Diesel: Evolution Et Mutations, SIA—Societe Des Ingenieurs De L'Automobile, Apr. 10–11, 1996, pp. 1–16.

Montagne, X. et al., "Analyse De La Sensibilite Aux Parametres Gazole D'Un Moteur Diesel D'Automobile A Injection Directe" Le Moteur Diesel: Evolutions Et Mutations, SIA—Societe Des Ingenieurs De L'Automobile, Apr. 10–11, 1996, pp. 1–16.

Herzog, P., "HSDI–Diesel–Euro III Technologies", Le Moteur Diesel: Evolution Et Mutations, SIA—Societe Des Ingeniuers De L'Automobile, Apr. 1996, pp. 1, 4, 8.

Feucht, H. et al., "Development Of The New Turbocharged 2.5I Four Valves Prechamber Diesel Engine For The Mercedes Benz Compact Class", Le Moteur Diesel: Evolution Et Mutations, SIA—Societe Des Ingeniuers De L'Automobile, Apr. 10–11, 1996, 15 pages.

Brun, R., "Science et technique du moteur diesel industriel et de transport", Institut Francais Du Petrole, 1981, 7 pages.

Briand, J., "Diesels marins description et fonctionnement" Masson, Paris, 1992, pp. 137–138.

"Moteurs Diesel", E.T.A.I., 1990, p. 330.

Foy, H., "Technologie Du Turbocompresseur", E.T.A.I., pp. 62, 65, 140.

Suzuki, T., et al., "Development of Diesel Combustion for Commercial Vehicles", Future Diesel Engines, Society of Automotive Engineers, Inc., SAE 9725685, 1997, pp. 47–65.

Iwata, N., et al., "Improvement of anit–knocking performance by supercharged Miller–Cycle engine—RAM–Pulsation effects on anti–knocking performance by Miller–Cycle", Mazda Motor Corporation, May 1995, No. 9534603.

Haugen, D., "Performance And Combustion Effects Of Phased Late Intake Valve Closure On A Two Intake Valve Engine", A Thesis Submitted to the Faculty of the Graduate School of the University of Minnesota, Dec. 1995, pp. 1–84.

Boggs, D. et al., "A Small Displacement DI Diesel Engine Concept for High Fuel Economy Vehicles", Future Diesel Engines, Aug. 6–8, 1997, SAE SP–1287, SAE No. 972680, pp. 1–97.

Kesgin, Ugur, "Efficiency Improvement and NOx emission reduction potentials of two–stage turbocharged Miller cycle for stationary natural gas engines", International Journal of Energy Research, 2005, vol. 29, pp. 189–216.

Communications from European Patent Office dated Apr. 21, 2005 and Feb. 23, 2005 from EP Patent Application Nos. 04029382.1 and 04029382.1–2311 including Partial Search Report, Lack of Unity Opinion, and Annex to Search Report.

http://www.mazda.com.au/corpora/209.html, Oct. 16, 2001, p. 1–6.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146–150.

Request for *Inter Partes* Reexamination Transmittal Form for U.S. Patent 6,651,618, and Attachment to Request for *Inter Partes* Reexamination Form, Aug. 27, 2004; Order Granting/Denying Request for Inter Partes Reexamination for Control No. 95/000,049 dated Nov. 23, 2004; Office Action in Inter Partes Reexamination for Control No. 95/000,049 dated Nov. 23, 2004.

Office Action dated Jun. 2, 2003, for U.S. Appl. No. 10/730, 852; Amendment filed Jul. 10, 2003, for U.S. Appl. No. 10/370,852.

Edwards et al., "The Potential of a Combined Miller Cycle and Internal EGR Engine for Future Heavy Duty Truck Applications," SAE International, International Congress and Exposition, Feb. 23–26, 1998, pp. 1–19.

Co–pending U.S. Appl. No. 10/992,198; Title: Combustion Engine Including Fluidically–Driven Engine Valve Actuator filed Nov. 19, 2004.

Co–pending U.S. Appl. No. 10/992,137; Title: Combustion Engine Including Fluidically–Controlled Engine Valve Actuator filed Nov. 19, 2004.

Office Action dated May 28, 2004, for U.S. Appl. No. 10/733,570, filed Nov. 24, 2004, for U.S. Appl. No. 10/733, 570.

Co–pending U.S. Appl. No. 10/933,300; Title: Air and Fuel Supply System for Combustion Engine filed Sep. 3, 2004.

Co–pending U.S. Appl. No. 10/992,074; Title: Combustion Engine Including Cam Phase–Shifting filed Nov. 19, 2004.

Co–pending U.S. Appl. No. 10/992,866; Title: Air and Fuel Supply System for Combustion Engine With Particulate Trap filed Nov. 19, 2004.

Co–pending U.S. Appl. No. 10/992,857; Title: Air and Fuel Supply for Combustion Engine Operating at Optimum Engine Speed filed Nov. 19, 2004.

Co–pending U.S. Appl. No. 10/992,897; Title: Air and Fuel Supply System for Combustion Engine filed Nov. 19, 2004.

Co–pending U.S. Appl. No. 10/933,065; Title: Air and Fuel Supply System for Combustion Engine Operating in HCCI Mode filed Nov. 19, 2004.

Co–pending U.S. Appl. No. 10/992,070; Title: Combustion Engine Including Exhaust Purification With On–Board Ammonia Production filed Nov. 19, 2004.

Co–pending U.S. Appl. No. 10/992,071; Title: Combustion Engine Including Engine Actuation System filed Nov. 19, 2004.

Co–pending U.S. Appl. No. 10/992,069; Title: Air and Fuel Supply System for Combustion Engine filed Nov. 19, 2004.

Co-pending U.S. Appl. No. 10/992,125; Title: Air and Fuel Supply System for a Combustion Engine filed Nov. 19, 2004.

Obert, *Internal Combustion Engines and Air Pollution* (Intext Educational Publishers, 1973), pp. 612 to 614.

Challen, et al., *Diesel Engine Reference Book* (Socy. Of Automotive Engineers, 1999), pp. 75, 81, 84, 146, 263–305.

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 17–20 is confirmed.

Claims 1–16 and 21–33 are cancelled.

* * * * *